United States Patent
Agrawal et al.

(10) Patent No.: US 8,582,596 B2
(45) Date of Patent: Nov. 12, 2013

(54) CODING AND MODULATION FOR BROADCAST AND MULTICAST SERVICES IN A WIRELESS COMMUNICATION SYSTEM

(75) Inventors: Avneesh Agrawal, San Diego, CA (US); Durga Prasad Malladi, San Diego, CA (US); Anastasios Stamoulis, San Diego, CA (US); Ashok Mantravadi, San Diego, CA (US); Ramaswamy Murali, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 772 days.

(21) Appl. No.: 11/144,180

(22) Filed: Jun. 2, 2005

(65) Prior Publication Data
US 2006/0013168 A1   Jan. 19, 2006

Related U.S. Application Data

(60) Provisional application No. 60/577,083, filed on Jun. 4, 2004.

(51) Int. Cl.
*H04B 7/212* (2006.01)
(52) U.S. Cl.
USPC ........................................................ 370/442
(58) Field of Classification Search
USPC ......... 370/204, 206–210, 280, 328, 329, 336, 370/337, 345, 347, 437, 442, 458, 478
See application file for complete search history.

(56) References Cited

U.S. PATENT DOCUMENTS

| | | | |
|---|---|---|---|
| 4,558,322 | A | 12/1985 | Tomasi |
| 4,914,651 | A | 4/1990 | Lusignan |
| 5,602,868 | A | 2/1997 | Wilson |
| 5,699,363 | A | 12/1997 | Wishart et al. |

(Continued)

FOREIGN PATENT DOCUMENTS

| | | |
|---|---|---|
| CA | 2314404 A1 | 1/2002 |
| CA | 2354196 A1 | 1/2003 |

(Continued)

OTHER PUBLICATIONS

International Search Report—PCT/US05/019529, International Search Authority—European Patent Office, Oct. 11, 2005.

(Continued)

*Primary Examiner* — Mark Rinehart
*Assistant Examiner* — Peter Cheng
(74) *Attorney, Agent, or Firm* — Larry J. Moskowitz

(57) ABSTRACT

Techniques for transmitting data in a wireless communication system are described. Physical channels to be sent in a super-frame are identified and allocated time slots in the super-frame. The coding and modulation for each physical channel are selected based on its capacity. The data for each physical channel is selectively encoded based on an outer code rate, e.g., for a Reed-Solomon code, and further encoded based on an inner code rate, e.g., for a Turbo code. The encoded data for each physical channel is mapped to modulation symbols based on a selected modulation scheme. The modulation symbols for each physical channel are further processed (e.g., OFDM modulated) and multiplexed onto the time slots allocated to the physical channel. Data to be sent using another radio technology (e.g., W-CDMA) is also processed and multiplexed onto time slots allocated for this radio technology.

41 Claims, 11 Drawing Sheets

(56) References Cited

U.S. PATENT DOCUMENTS

| | | | |
|---|---|---|---|
| 5,867,478 A | 2/1999 | Baum et al. | |
| 5,943,344 A | 8/1999 | Keller et al. | |
| 6,031,874 A * | 2/2000 | Chennakeshu et al. | 375/262 |
| 6,115,354 A | 9/2000 | Weck | |
| 6,208,873 B1 | 3/2001 | Black et al. | |
| 6,366,309 B1 | 4/2002 | Siegle | |
| 6,470,024 B1 * | 10/2002 | Hamalainen et al. | 370/459 |
| 6,529,482 B1 | 3/2003 | Lundby | |
| 6,567,375 B2 * | 5/2003 | Balachandran et al. | 370/204 |
| 6,594,473 B1 | 7/2003 | Dabak et al. | |
| 6,661,771 B1 | 12/2003 | Cupo et al. | |
| 6,728,233 B1 | 4/2004 | Park et al. | |
| 6,747,948 B1 | 6/2004 | Sarraf et al. | |
| 6,788,661 B1 | 9/2004 | Ylitalo et al. | |
| 6,795,419 B2 * | 9/2004 | Parantainen et al. | 370/337 |
| 6,842,487 B1 | 1/2005 | Larsson | |
| 6,853,629 B2 | 2/2005 | Alamouti et al. | |
| 6,885,630 B2 | 4/2005 | Kostic et al. | |
| 6,909,702 B2 | 6/2005 | Leung et al. | |
| 6,927,728 B2 | 8/2005 | Vook et al. | |
| 6,940,824 B2 | 9/2005 | Shibutani | |
| 6,940,827 B2 | 9/2005 | Li et al. | |
| 6,961,388 B2 | 11/2005 | Ling et al. | |
| 6,999,467 B2 | 2/2006 | Krauss et al. | |
| 7,027,523 B2 | 4/2006 | Jalali et al. | |
| 7,099,270 B2 | 8/2006 | Yamaguchi | |
| 7,110,387 B1 | 9/2006 | Kim et al. | |
| 7,139,237 B2 | 11/2006 | Nangia et al. | |
| 7,181,170 B2 * | 2/2007 | Love et al. | 455/67.13 |
| 7,273,869 B2 | 9/2007 | Lindsley et al. | |
| 7,280,552 B2 | 10/2007 | Isson | |
| 7,292,651 B2 | 11/2007 | Li | |
| 7,313,118 B2 | 12/2007 | Geers | |
| 7,379,416 B2 | 5/2008 | Yang et al. | |
| 7,391,715 B2 | 6/2008 | Lee et al. | |
| 7,433,418 B1 | 10/2008 | Dogan et al. | |
| 7,436,903 B2 | 10/2008 | Sandhu et al. | |
| 7,471,729 B2 | 12/2008 | Miyoshi | |
| 7,483,366 B2 | 1/2009 | Joo et al. | |
| 7,706,346 B2 | 4/2010 | Huo et al. | |
| 7,920,884 B2 | 4/2011 | Agrawal et al. | |
| 8,089,855 B2 | 1/2012 | Agrawal et al. | |
| 2002/0049859 A1 | 4/2002 | Bruckert et al. | |
| 2002/0086691 A1 | 7/2002 | Kostic et al. | |
| 2002/0141447 A1 | 10/2002 | Leung et al. | |
| 2002/0159422 A1 | 10/2002 | Li et al. | |
| 2003/0002450 A1 | 1/2003 | Jalali et al. | |
| 2003/0002518 A1 * | 1/2003 | Shibutani | 370/442 |
| 2003/0043928 A1 * | 3/2003 | Ling et al. | 375/267 |
| 2003/0072255 A1 | 4/2003 | Ma et al. | 370/208 |
| 2003/0074476 A1 * | 4/2003 | Kim et al. | 709/246 |
| 2003/0081538 A1 | 5/2003 | Walton et al. | |
| 2003/0112744 A1 | 6/2003 | Baum et al. | |
| 2003/0137926 A1 | 7/2003 | Joo et al. | |
| 2003/0152043 A1 | 8/2003 | Geers | |
| 2003/0156570 A1 | 8/2003 | Alamouti et al. | |
| 2003/0174642 A1 | 9/2003 | Yang et al. | |
| 2003/0174645 A1 | 9/2003 | Paratainen et al. | 370/229 |
| 2003/0227866 A1 | 12/2003 | Yamaguchi | |
| 2004/0023665 A1 | 2/2004 | Simmonds et al. | |
| 2004/0086055 A1 | 5/2004 | Li | |
| 2004/0178954 A1 | 9/2004 | Vook et al. | |
| 2004/0213145 A1 | 10/2004 | Nakamura | |
| 2004/0218607 A1 * | 11/2004 | Hurtta et al. | 370/395.21 |
| 2004/0228294 A1 | 11/2004 | Kim et al. | |
| 2005/0014464 A1 | 1/2005 | Larsson | |
| 2005/0047481 A1 | 3/2005 | Lyle et al. | |
| 2005/0063345 A1 * | 3/2005 | Wu et al. | 370/335 |
| 2005/0163258 A1 | 7/2005 | Gore et al. | |
| 2005/0207389 A1 * | 9/2005 | Shiao et al. | 370/348 |
| 2005/0249177 A1 | 11/2005 | Huo et al. | |
| 2005/0276344 A1 * | 12/2005 | Ling et al. | 375/260 |
| 2006/0013186 A1 | 1/2006 | Agrawal et al. | |
| 2006/0013325 A1 | 1/2006 | Agrawal et al. | |
| 2007/0070944 A1 | 3/2007 | Rinne et al. | |
| 2007/0189404 A1 | 8/2007 | Baum et al. | |
| 2009/0304120 A1 | 12/2009 | Agrawal et al. | |

FOREIGN PATENT DOCUMENTS

| | | |
|---|---|---|
| CN | 1363157 A | 8/2002 |
| DE | 04425713 | 7/1995 |
| EP | 0588741 | 3/1994 |
| EP | 0869647 A2 | 10/1998 |
| EP | 1061687 A1 | 12/2000 |
| EP | 1065855 | 1/2001 |
| EP | 1109365 A1 | 6/2001 |
| EP | 1148673 | 10/2001 |
| EP | 1221778 A1 | 7/2002 |
| EP | 1298948 A1 | 4/2003 |
| EP | 1387545 | 2/2004 |
| GB | 2384958 A | 8/2003 |
| GB | 2394871 A * | 5/2004 |
| GB | 2394871 A | 5/2004 |
| JP | 7245574 | 9/1995 |
| JP | H09512156 A | 12/1997 |
| JP | 2000236343 | 8/2000 |
| JP | 2001511966 T | 8/2001 |
| JP | 2001320346 A | 11/2001 |
| JP | 2001358694 A | 12/2001 |
| JP | 2003018647 A | 1/2003 |
| JP | 2003234696 A | 8/2003 |
| JP | 200432380 | 1/2004 |
| JP | 2004064654 A | 2/2004 |
| JP | 2004064793 A | 2/2004 |
| JP | 2004096186 | 3/2004 |
| JP | 2004096445 A | 3/2004 |
| JP | 2004507121 | 3/2004 |
| JP | 2004158901 A | 6/2004 |
| JP | 2004159303 | 6/2004 |
| JP | 2004533746 | 11/2004 |
| JP | 2007518290 T | 7/2007 |
| JP | 2008502224 | 1/2008 |
| JP | 2008502225 T | 1/2008 |
| KR | 1020040011653 | 2/2004 |
| RU | 2183387 C2 | 6/2002 |
| WO | 9730531 | 8/1997 |
| WO | WO9824250 A2 | 6/1998 |
| WO | WO9959278 A1 | 11/1999 |
| WO | WO0004728 A2 | 1/2000 |
| WO | WO0101626 A1 | 1/2001 |
| WO | WO0135537 A2 | 5/2001 |
| WO | 0161899 | 8/2001 |
| WO | 0204086 | 1/2002 |
| WO | 0205004 | 1/2002 |
| WO | 0221715 | 3/2002 |
| WO | 0235735 | 5/2002 |
| WO | WO0251024 A1 | 6/2002 |
| WO | 02011317 | 7/2002 |
| WO | WO02062002 A1 | 8/2002 |
| WO | WO02073831 A1 | 9/2002 |
| WO | 02082834 | 10/2002 |
| WO | WO03034642 A2 | 4/2003 |
| WO | WO03034645 A1 | 4/2003 |
| WO | WO03047140 A1 | 6/2003 |
| WO | WO03069824 A2 | 8/2003 |
| WO | WO2004036767 | 4/2004 |
| WO | WO2004039011 | 5/2004 |
| WO | WO2004068780 A1 | 8/2004 |
| WO | 2004086711 | 10/2004 |
| WO | 2005004428 | 1/2005 |
| WO | 2005022811 | 3/2005 |
| WO | 2005071867 | 8/2005 |
| WO | 2005122425 | 12/2005 |

OTHER PUBLICATIONS

International Preliminary Report on Patentability—PCT/US05/019529, International Search Authority—IPEA/US—Alexandria, Virginia—Sep. 27, 2006.

Written Opinion—PCT/US05/019529, International Search Authority—European Patent Office—Oct. 11, 2005.

(56) References Cited

OTHER PUBLICATIONS

"3rd Generation Partnership Project 2 '3GPP2' CDMA2000 High Rate Packet Data Air Interface Specification," 3GPP2 C.S0024 Version 3.0, Dec. 5, 2001.

3GPP2, CDMA2000 High Rate Packed Data Air Interface Specification, Sep. 12, 2000, sections 7-1 to 7-30.

Alasti et al., "A Discrete Multi Carrier Multiple Access Technique for Wireless Communications." Vehicular Technology Conference, vol. 2, May 18, 1998, pp. 1533-1537, New York, US.

Dammann et al., "Transmit/Receive-Antenna Diversity Techniques for OFDM Systems." European Transactions on Telecommunications, vol. 13, No. 5, Sep. 2002, pp. 531-538, Milano, IT.

Shaoping Chen et al., "A Space-Time Coding Scheme with Maximum Diversity Gains Over Frequency-Selective Fading Channels." Personal, Indoor and Mobile Radio Communications, vol. 2, Sep. 7-10, 2003, pp. 2567-2570, Piscataway, NJ.

Weck C., "Coverage Aspects of Digital Terrestrial Television Broadcasting" EBU Review-Technical, European Broadcasting Union, No. 270, Dec. 21, 1996, pp. 19-30.

Van Duc Nguyen et al., "Performance of Channel Estimation Using Pilot Symbols for a Coherent OFDM System" International Symposium on Wireless Personal Multimedia Communications, vol. 2, Nov. 12, 2000, pp. 842-847.

LG Electronics Inc.:"MCCH Information Transmission," pp. 1-3, Malaga, Spain Feb. 16-20, 2004.

"Introduction of Multimedia Broadcast/Multicast Service (MBMS) in the Radio Access Network (RAN)", ETSI-3GPP, version 6.1, Jul. 2004, pp. 1-52.

International Search Report and Written Opinion—PCT/US05/019541, International Search Authority—European Patent Office, Sep. 28, 2005.

International Search Report and Written Opinion—PCT/US05/019542, International Search Authority—US, Oct. 5, 2005.

International Search Report and Written Opinion—PCT/US05/019543, International Search Authority—European Patent Office, Sep. 27, 2005.

International Search Report and Written Opinion—PCT/US05/019544, International Search Authority—European Patent Office, Dec. 12, 2005.

Taiwan Search Report—TW094118501—TIPO—Jul. 15, 2011.

Siemens, "Advanced interleaver for outer coding in MBMS (FDD)", 3GPP TSG-RAN WG1 Rel.6 Ad hoc, R1-040072, Jan. 2004 URL: http://www.3gpp.org/ftp/tsg_ran/WG1_RL1/TSGR1_AH/Rel-6_Ad_Hoc/Docs/Zips/R1-040072.zip (JP-N6-10-031375).

Siemens, "Outer Coding Performance for MBMS (FDD)", 3GPP TSG-RAN WG#34, R1-031017, Oct. 2003 URL: http://www.3gpp.org/ftp/tsg_ran/WG1_RL1/TSGR1_34/Docs/Zips/R1-031017.zip (.JP-N6-10-031372).

Ojanpera, T. et al., "Frames—Hybrid Multiple Access Technology," IEEE International Symposium on Spread Spectrum Techniques and Applications, No. 1, Sep. 22, 1996, pp. 320-324.

Co-pending U.S. Appl. No. 09/567,819, filed May 9, 2000.

\* cited by examiner

CODING AND MODULATION FOR BROADCAST AND MULTICAST SERVICES IN A WIRELESS COMMUNICATION SYSTEM

CLAIM OF PRIORITY UNDER 35 U.S.C. §119

The present Application for Patent claims priority to Provisional Application Ser. No. 60/577,083, entitled "FLO-TDD physical layer," filed Jun. 4, 2004, assigned to the assignee hereof, and expressly incorporated herein by reference.

BACKGROUND

I. Field

The present invention relates generally to communication, and more specifically to techniques for transmitting data in a wireless communication system.

II. Background

Wireless communication systems are widely deployed to provide various communication services such as voice, packet data, multi-media broadcast, text messaging, and so on. These systems may be multiple-access systems capable of supporting communication for multiple users by sharing the available system resources. Examples of such multiple-access systems include Code Division Multiple Access (CDMA) systems, Time Division Multiple Access (TDMA) systems, Frequency Division Multiple Access (FDMA) systems, and Orthogonal Frequency Division Multiple Access (OFDMA) systems. A CDMA system may implement Wideband CDMA (W-CDMA), cdma2000, and so on. W-CDMA is described in documents from a consortium named "3rd Generation Partnership Project" (3GPP). cdma2000 is described in documents from a consortium named "3rd Generation Partnership Project 2" (3GPP2). 3GPP and 3GPP2 documents are publicly available.

W-CDMA and cdma2000 employ direct sequence CDMA (DS-CDMA), which spectrally spreads a narrowband signal over the entire system bandwidth with a spreading code. DS-CDMA has certain advantages such as ease of supporting multiple access, narrowband rejection, and so on. However, DS-CDMA is susceptible to frequency selective fading, which causes intersymbol interference (ISI). A complicated receiver with an equalizer may be needed to combat the intersymbol interference.

A wireless communication system may send multicast and broadcast transmissions that are variable in nature. A multicast transmission is a transmission sent to a group of terminals, and a broadcast transmission is a transmission sent to all terminals within a broadcast coverage area. For example, the multicast and broadcast transmissions may have variable data rates that change over time. Furthermore, the number of transmissions and/or the types of transmissions to be sent may change over time. For this system, it is challenging to allocate and utilize the available system resources for the transmissions in an efficient manner.

There is therefore a need in the art for techniques to send variable transmissions in a wireless communication system.

SUMMARY

Techniques for efficiently allocating system resources to physical channels and for processing and transmitting the physical channels in a wireless communication system are described herein. These techniques may be used for various types of transmissions such as unicast, multicast, and broadcast transmissions and for various services such as Enhanced Multimedia Broadcast/Multicast Service (E-MBMS).

According to an embodiment of the invention, an apparatus is described which includes a controller and a processor. The controller identifies at least one physical channel to be sent in a super-frame comprised of multiple time slots. The controller allocates at least two time slots in the super-frame to each physical channel and selects the coding and modulation for each physical channel, e.g., based on the capacity of the physical channel. The processor processes (e.g., encodes and modulates) the data for each physical channel based on the coding and modulation selected for that physical channel. The processor further multiplexes the processed data for each physical channel onto the at least two time slots allocated to that physical channel.

According to another embodiment, a method is provided in which at least one physical channel to be sent in a super-frame comprised of multiple time slots is identified. At least two time slots in the super-frame are allocated to each physical channel. Coding and modulation are selected for each physical channel. The data for each physical channel is processed based on the coding and modulation selected for that physical channel. The processed data for each physical channel is then multiplexed onto the at least two time slots allocated to that physical channel.

According to yet another embodiment, an apparatus is described which includes means for identifying at least one physical channel to be sent in a super-frame comprised of multiple time slots, means for allocating at least two time slots in the super-frame to each physical channel, means for selecting coding and modulation for each physical channel, means for processing the data for each physical channel based on the coding and modulation selected for that physical channel, and means for multiplexing the processed data for each physical channel onto the at least two time slots allocated to that physical channel.

According to yet another embodiment, an apparatus is described which includes a controller and a processor. The controller identifies at least one physical channel to be received in a super-frame comprised of multiple time slots. The controller determines at least two time slots allocated to each physical channel and also determines the coding and modulation used for each physical channel. The processor demultiplexes received data for each physical channel from the at least two time slots allocated to that physical channel. The processor further processes the received data for each physical channel based on the coding and modulation used for that physical channel.

According to yet another embodiment, a method is provided in which at least one physical channel to be received in a super-frame comprised of multiple time slots is identified. At least two time slots allocated to each physical channel are determined. The coding and modulation used for each physical channel are also determined. Received data for each physical channel is demultiplexed from the at least two time slots allocated to that physical channel. The received data for each physical channel is then processed based on the coding and modulation used for that physical channel.

According to yet another embodiment, an apparatus is described which includes means for identifying at least one physical channel to be received in a super-frame comprised of multiple time slots, means for determining at least two time slots allocated to each physical channel, means for determining the coding and modulation used for each physical channel, means for demultiplexing received data for each physical channel from the at least two time slots allocated to that physical channel, and means for processing the received data for each physical channel based on the coding and modulation used for that physical channel.

Various aspects and embodiments of the invention are described in further detail below.

DETAILED DESCRIPTION

The word "exemplary" is used herein to mean "serving as an example, instance, or illustration." Any embodiment described herein as "exemplary" is not necessarily to be construed as preferred or advantageous over other embodiments.

Figure 1:
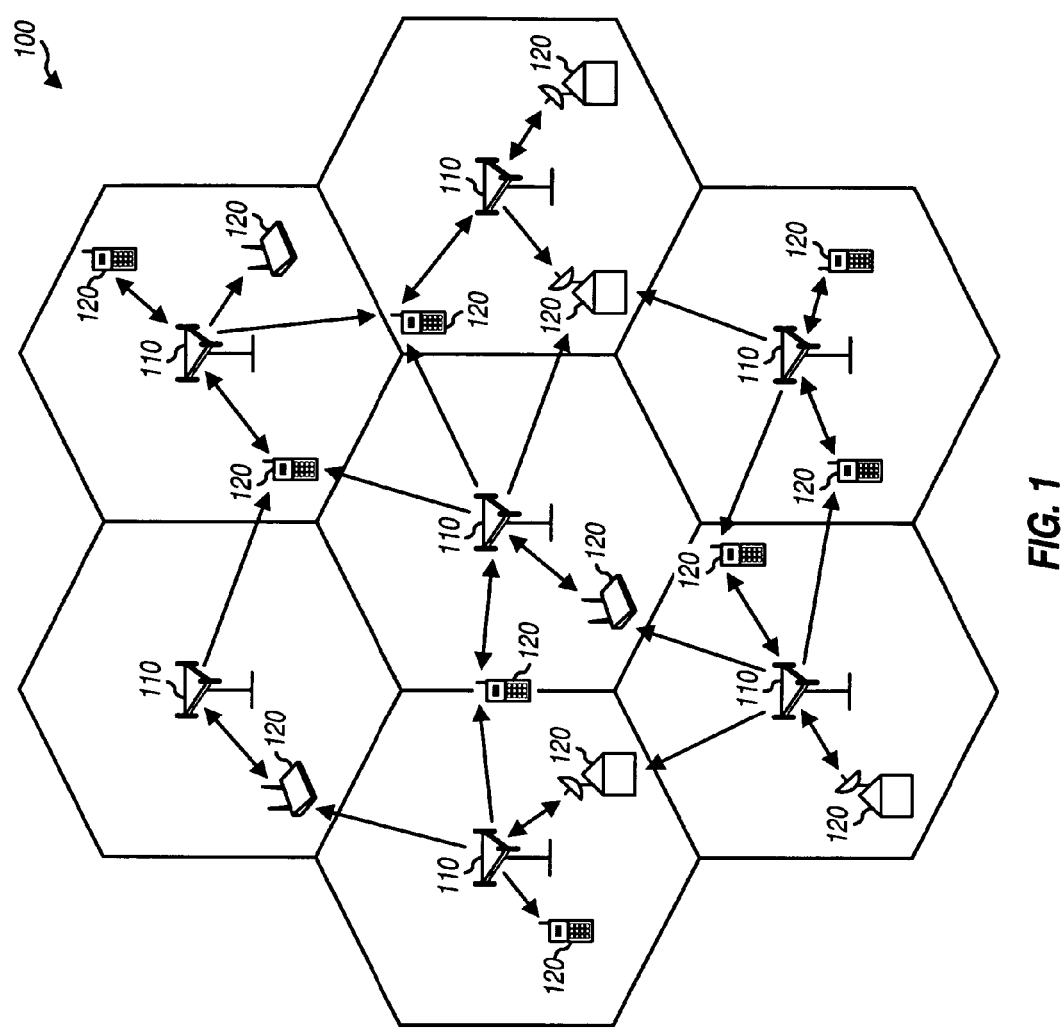
FIG. 1 shows a wireless communication system.

FIG. 1 shows a wireless communication system 100 with multiple base stations 110 and multiple terminals 120. A base station is generally a fixed station that communicates with the terminals and may also be called a Node B, an access point, a base transceiver subsystem (BTS), or some other terminology. Each base station 110 provides communication coverage for a particular geographic area. The term "cell" can refer to a base station and/or its coverage area depending on the context in which the term is used. Terminals 120 may be dispersed throughout the system. A terminal may be fixed or mobile and may also be called a mobile station, a wireless device, a user equipment, a user terminal, a subscriber unit, or some other terminology. The terms "terminal" and "user" are used interchangeably herein. A terminal may communicate with zero, one, or multiple base stations on the downlink and/or uplink at any given moment. The downlink (or forward link) refers to the communication link from the base stations to the terminals, and the uplink (or reverse link) refers to the communication link from the terminals to the base stations.

The transmission techniques described herein may be used for various radio technologies such as W-CDMA, cdma2000, IS-856, other versions of CDMA, Orthogonal Frequency Division Multiplexing (OFDM), Interleaved FDMA (IFDMA) (which is also called Distributed FDMA), Localized FDMA (LFDMA) (which is also called Narrowband FDMA or Classical FDMA), Global System for Mobile Communications (GSM), direct sequence spread spectrum (DSSS), frequency hopping spread spectrum (FHSS), and so on. W-CDMA and cdma2000 utilize direct sequence CDMA (DS-CDMA), which spectrally spreads a narrowband signal over the entire system bandwidth. OFDM, IFDMA, and LFDMA are multi-carrier radio technologies that effectively partition the overall system bandwidth into multiple (S) orthogonal frequency subbands. These subbands are also called tones, subcarriers, bins, and frequency channels. Each subband is associated with a respective subcarrier that may be modulated with data. OFDM transmits modulation symbols in the frequency domain on all or a subset of the S subbands. IFDMA transmits modulation symbols in the time domain on subbands that are uniformly distributed across the S subbands. LFDMA transmits modulation symbols in the time domain and typically on adjacent subbands. The use of OFDM for unicast, multicast, and broadcast transmissions may also be considered as different radio technologies. The list of radio technologies given above is not exhaustive, and the transmission techniques may also be used for other radio technologies not mentioned above. For clarity, the transmission techniques are specifically described below for W-CDMA and OFDM.

Figure 2:
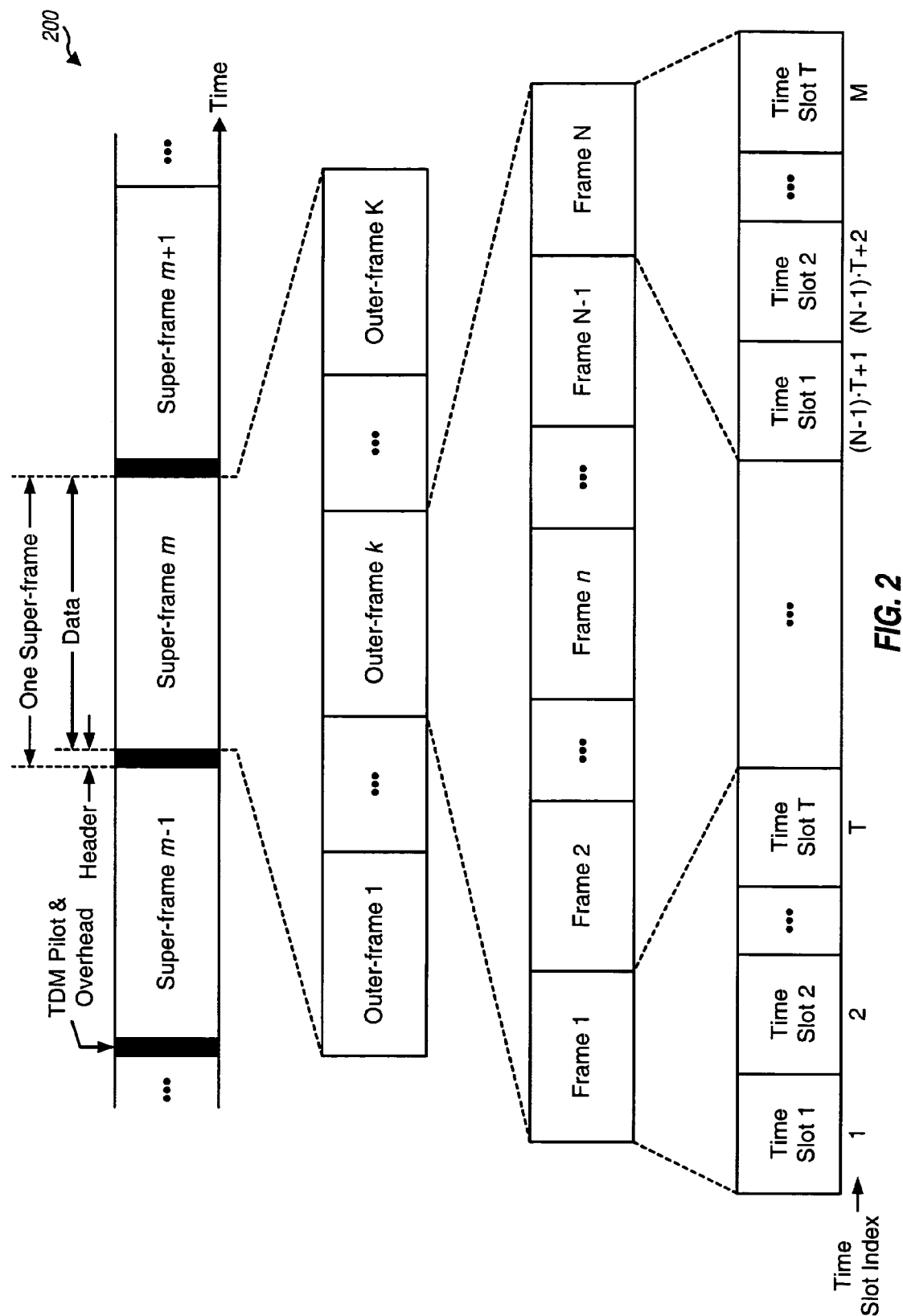
FIG. 2 shows an exemplary 4-tier super-frame structure.

FIG. 2 shows an exemplary 4-tier super-frame structure 200 that may be used to transmit data, pilot, and signaling in system 100. The transmission time line is partitioned into super-frames, with each super-frame having a predetermined time duration, e.g., approximately one second. For the embodiment shown in FIG. 2, each super-frame includes (1) a header field for a time division multiplexed (TDM) pilot and overhead/control information and (2) a data field for traffic data and a frequency division multiplexed (FDM) pilot. The TDM pilot may be used for synchronization, e.g., super-frame detection, frequency error estimation, and timing acquisition. The TDM and FDM pilots may be used for channel estimation. The overhead information for each super-frame may convey various parameters for the transmissions sent in that super-frame, e.g., the time slots and the coding and modulation used for each transmission.

The data field of each super-frame is partitioned into K equal-size outer-frames to facilitate data transmission, where K>1. Each outer-frame is partitioned into N frames, and each frame is further partitioned into T time slots, where N>1 and T>1. Each outer-frame thus includes M=N·T time slots that are assigned indices of 1 through M. In general, a super-frame may include any number of outer-frames, frames, and time slots. The super-frame, outer-frame, frame, and time slot may also be referred to by some other terminology.

Figure 3:
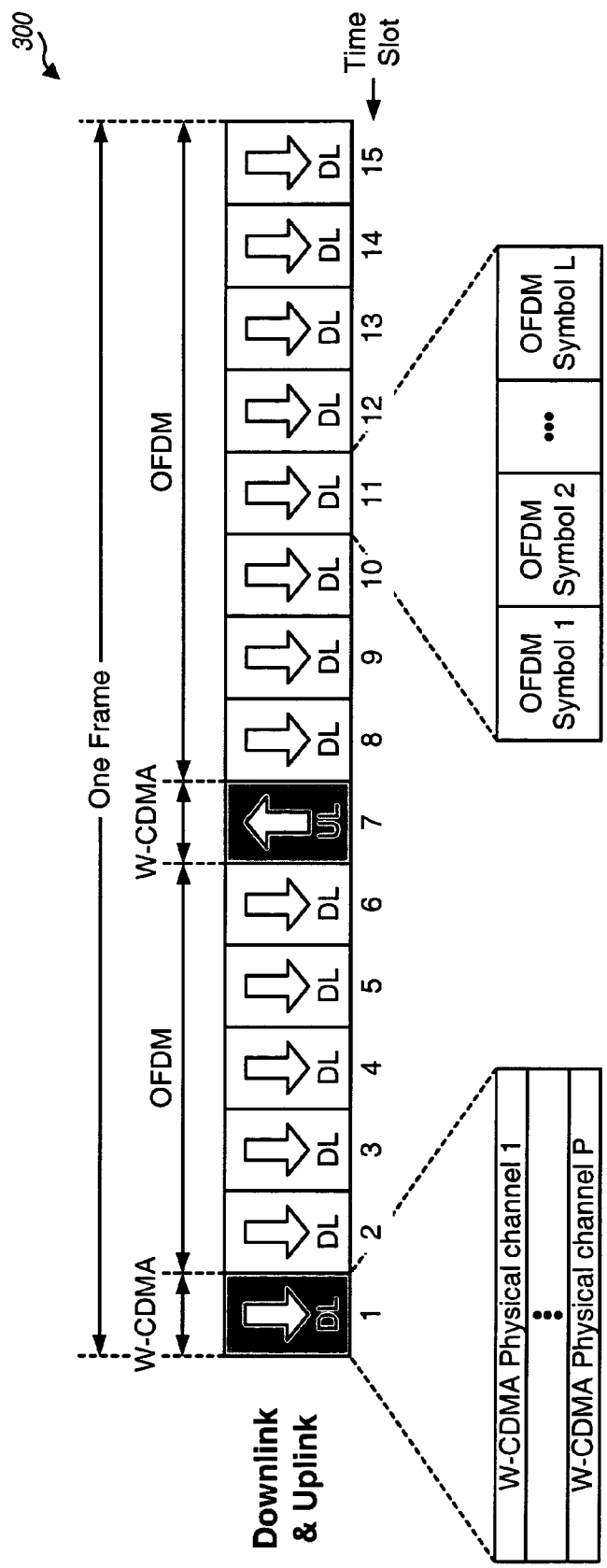
FIG. 3 shows multiplexing of W-CDMA and OFDM in a frame.

FIG. 3 shows an exemplary multiplexing of W-CDMA and OFDM in a frame for a time division duplexed (TDD) system. In general, each time slot in the frame may be used for either the downlink (DL) or uplink (UL). A time slot used for the downlink is called a downlink slot, and a time slot used for the uplink is called an uplink slot. Any radio technology (e.g., W-CDMA or OFDM) may be used for each time slot. A time slot used for W-CDMA is called a W-CDMA slot, and a time slot used for OFDM is called an OFDM slot. A time slot used for the downlink with OFDM is called an E-MBMS slot. For the example shown in FIG. 3, time slot 1 is a downlink W-CDMA slot, time slots 2 through 6 are E-MBMS slots, time slot 7 is an uplink W-CDMA slot, and time slot 8 through 15 are E-MBMS slots. For each downlink W-CDMA slot, data for one or more physical channels may be channelized with different orthogonal (e.g., OVSF) sequences, spectrally spread with scrambling codes, combined in the time domain, and transmitted across the entire W-CDMA slot. For each E-MBMS slot, L OFDM symbols may be generated for the data to be sent in that E-MBMS slot, where $L \geq 1$. For example, three OFDM symbols may be sent in each E-MBMS slot, and each OFDM symbol may have a duration of about 220 microseconds (μs).

For a frequency division duplexed (FDD) system that supports W-CDMA and OFDM, the downlink and uplink are transmitted simultaneously on separate frequency bands. Each time slot on the downlink may be used for W-CDMA or OFDM.

FIGS. 2 and 3 show an exemplary super-frame structure. The transmission techniques described herein may be used with other super-frame structures and for systems utilizing other radio technologies.

Table 1 shows three exemplary frame designs for the super-frame structure shown in FIGS. 2 and 3. For these frame designs, the header field for the TDM pilot and overhead information is 40 milliseconds (ms), each super-frame includes four outer-frames (K=4), the frames and time slots conform to W-CDMA, and two time slots in each frame are reserved for W-CDMA. For W-CDMA, each frame has a duration of 10 ms and includes 15 time slots (T=15), each time slot has a duration of 0.667 ms and includes 2560 chips, and each chip has a duration of 0.26 microseconds (μs) for a system bandwidth of 3.84 MHz. The number of time slots per outer-frame (M) is equal to the number of time slots per frame (T) times the number of frames per outer-frame (N), or M=T× N. The maximum number of E-MBMS slots per outer-frame (V) is equal to the maximum number of E-MBMS slots per frame (13) times the number of frames per outer-frame (N), or V=13×N. Other frame designs with other values for K, N, T, M and V may also be used and are within the scope of the invention.

TABLE 1

| Parameters | Frame Design 1 | Frame Design 2 | Frame Design 3 |
| --- | --- | --- | --- |
| Super-frame duration | 1320 ms | 1280 ms | 1000 ms |
| TDM pilot and overhead duration | 40 ms | 40 ms | 40 ms |
| Outer-frame duration | 320 ms | 310 ms | 240 ms |
| Frame duration | 10 ms | 10 ms | 10 ms |
| Number of frames/outer-frame | N = 32 | N = 31 | N = 24 |
| Number of time slots/frame | T = 15 | T = 15 | T = 15 |
| Number of time slots/outer-frame | M = 480 | M = 465 | M = 360 |
| Max number of E-MBMS slots/outer-frame | V = 416 | V = 403 | V = 312 |

Each outer-frame includes M time slots that may be used for W-CDMA and OFDM, as shown in FIG. 2. Zero, one, or multiple time slots (e.g., two time slots in each frame) may be reserved for W-CDMA. The unreserved time slots may be allocated to W-CDMA and OFDM in various manners and based on various factors such as system loading, usage requirements, and so on.

Figure 4:
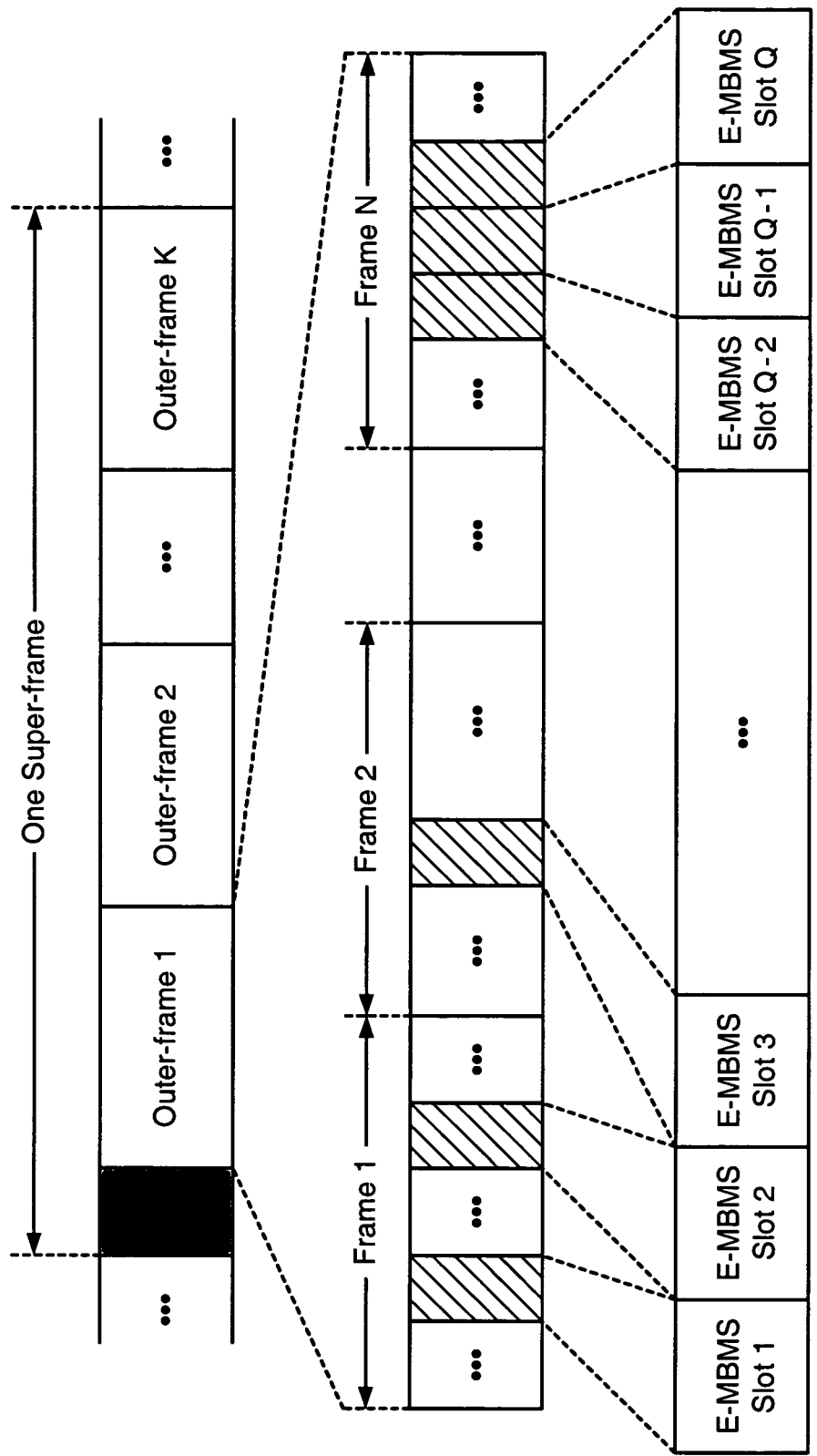
FIG. 4 shows allocation of time slots in a super-frame for E-MBMS.

FIG. 4 shows an embodiment for allocating time slots in a super-frame for E-MBMS. For this embodiment, each time slot that is not reserved for W-CDMA may be used as an E-MBMS slot. For the example shown in FIG. 4, two time slots in frame 1 of outer-frame 1 are allocated for E-MBMS, one time slot in frame 2 is allocated for E-MBMS, and so on, and three time slots in frame N are allocated for E-MBMS. The E-MBMS slots in each outer-frame may be assigned sequential indices 1 through Q, where Q is the number of E-MBMS slots in one outer-frame. The unreserved time slots may also be allocated for E-MBMS in other manners. For example, the N frames in each outer-frame of a given super-frame may contain the same set of E-MBMS slots so that each frame contains E-MBMS slots at the same slot indices. The number of E-MBMS slots in each outer-frame (Q) is then equal to the number of E-MBMS slots per frame (G) times the number of frames per outer-frame (N), or Q=G×N.

The system may define physical channels to facilitate transmission of data. A physical channel is a means for sending data at a physical layer and may also be called a physical layer channel, a traffic channel, a transmission channel, and so on. A physical channel that is transmitted on the downlink using OFDM is called an E-MBMS physical channel. E-MBMS physical channels may be used to send various types of data (e.g., multicast data, broadcast data, control data, and so on) and may be used for various services (e.g., E-MBMS). A given E-MBMS physical channel may or may not be transmitted in a given super-frame.

In an embodiment, an E-MBMS physical channel that is transmitted in a given super-frame is allocated at least one time slot in at least one frame of each outer-frame in the super-frame. For this embodiment, the E-MBMS physical channel has the same slot and frame allocation for all K outer-frames of the super-frame. For example, the E-MBMS physical channel may be allocated time slot t in frame n of each outer-frame in the super-frame. In this example, the E-MBMS physical channel is allocated a total of K time slots that are evenly spaced apart by M time slots. For this embodiment, an E-MBMS physical channel is allocated an integer multiple of a minimum slot allocation. This minimum slot allocation is one time slot in each outer-frame of a super-frame. If the E-MBMS physical channel is allocated multiple times the minimum slot allocation, then the multiple time slots in each outer-frame may be adjacent to one another or distributed across the outer-frame.

The slot allocation embodiment described above provides various advantages. First, time diversity is achieved since the time slots allocated to an E-MBMS physical channel are distributed across a super-frame and are separated by M time slots. Second, the allocation of time slots to E-MBMS physical channels is simplified because of the structured manner in which time slots are allocated to E-MBMS physical channels. Third, the slot allocation may be conveyed with a small amount of overhead information. Fourth, the allocation of an entire time slot to one E-MBMS physical channel simplifies processing (e.g., coding and modulation) at a base station and a terminal for the E-MBMS physical channel. However, the time slots may also be allocated to E-MBMS physical channels in other manners (e.g., multiple E-MBMS physical channels may share one time slot or one OFDM symbol), and this is within the scope of the invention.

In an embodiment, an E-MBMS physical channel that is sent in a given super-frame is processed based on the coding and modulation selected for that E-MBMS physical channel for the super-frame. The coding and modulation for the E-MBMS physical channel remains constant for the entire duration of the super-frame but can change from super-frame to super-frame.

In an embodiment, an E-MBMS physical channel has a configurable capacity that can change from super-frame to super-frame. The capacity of the E-MBMS physical channel is determined by (1) the number of time slots allocated to the E-MBMS physical channel and (2) the number of information bits that can be sent on the E-MBMS physical channel in one super-frame with the minimum slot allocation. The configurable capacity may be used to support variable rate coders/decoders (codecs) (e.g., audio codecs, video codecs, and so on) used to encode raw data to generate the information bits for the E-MBMS physical channel. The configurable capacity may also be used to trade off between the amount of data that can be sent for a broadcast transmission versus the coverage for the broadcast transmission.

In an embodiment, one transport block is sent on an E-MBMS physical channel in a super-frame for the minimum slot allocation. The size of the transport block is configurable and affects the capacity of the E-MBMS physical channel. The coding and modulation are selected such that the transport block can be sent in the time slots for the minimum slot allocation. Multiple transport blocks may be sent on the E-MBMS physical channel in the super-frame if the E-MBMS physical channel is allocated multiple times the minimum slot allocation.

Figure 5:
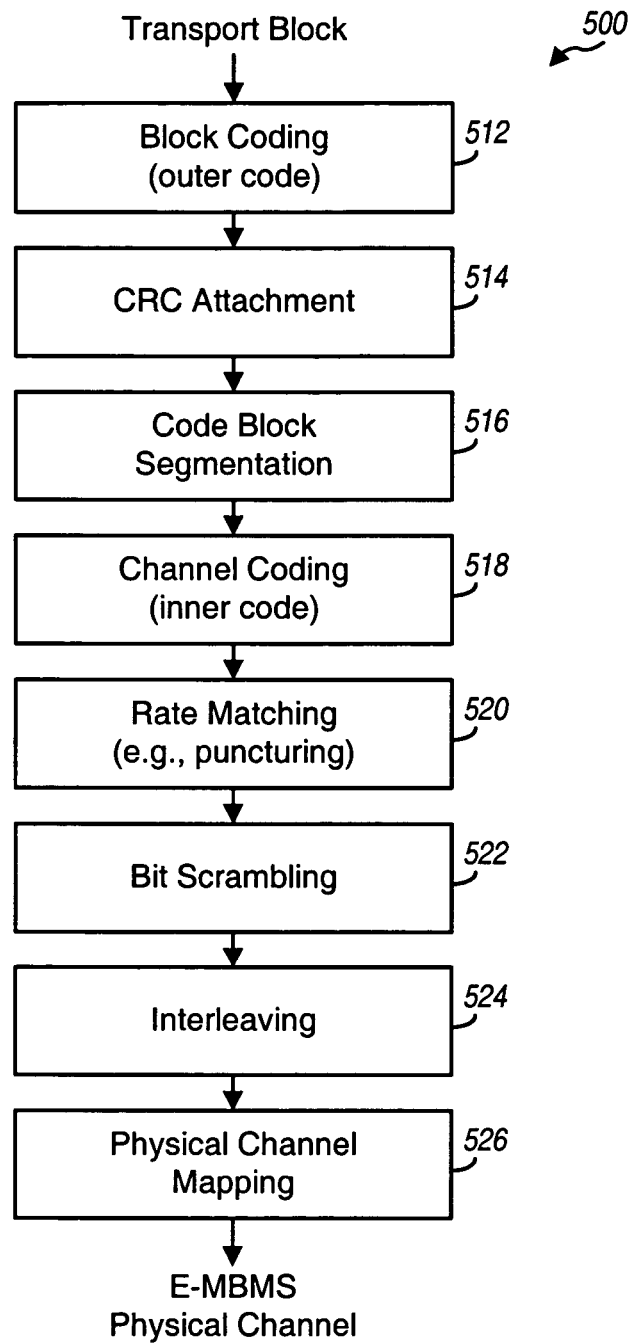
FIG. 5 shows data processing for E-MBMS.

FIG. 5 shows an embodiment of the data processing for E-MBMS. For clarity, FIG. 5 shows the processing for one E-MBMS physical channel.

Figure 6:
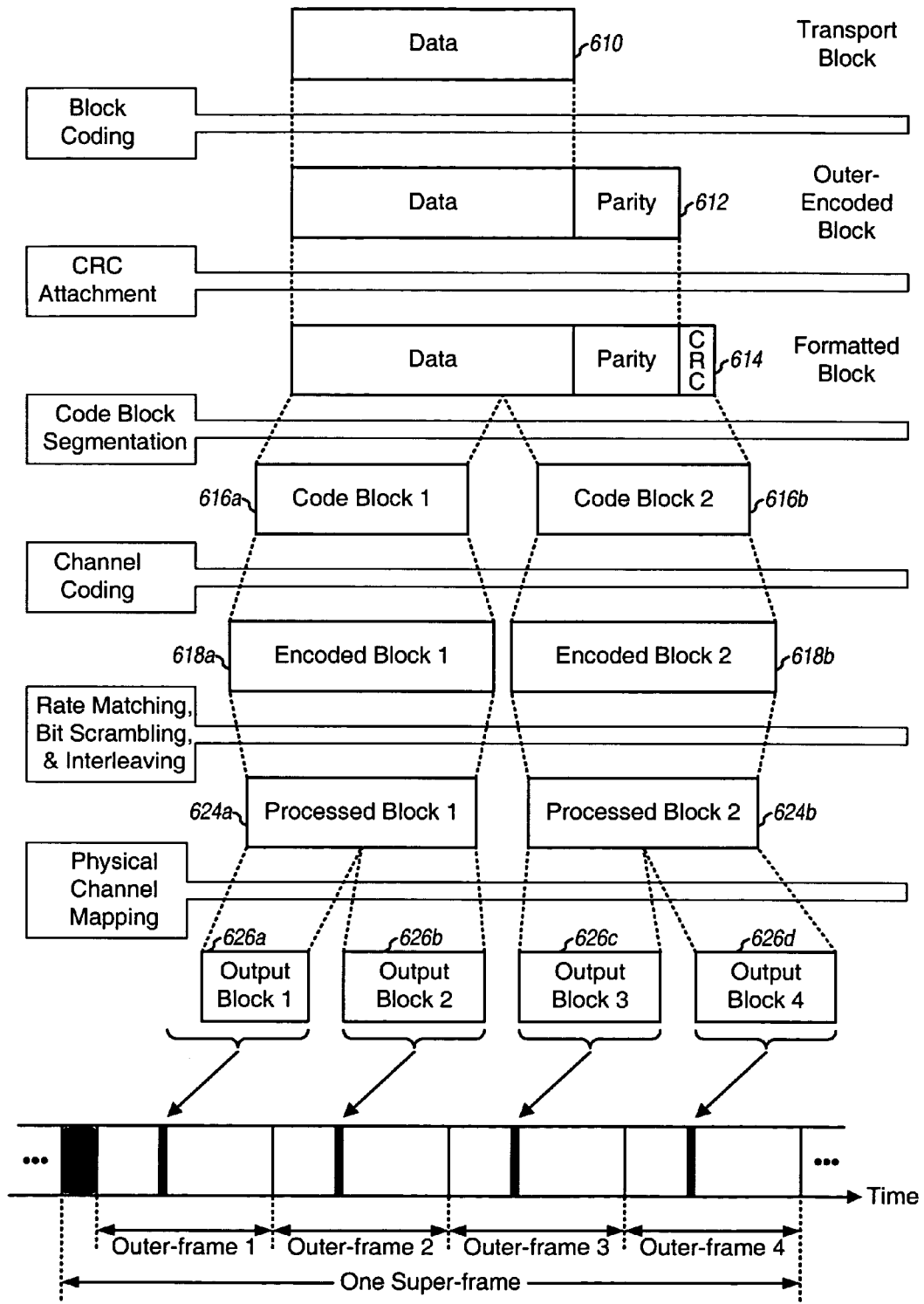
FIG. 6 illustrates the processing and transmission of a transport block on an E-MBMS physical channel in a super-frame.

FIG. 6 illustrates the processing and transmission for one transport block 610 on one E-MBMS physical channel in one super-frame. The processing of the transport block is described below with reference to both FIGS. 5 and 6.

Transport block 610 may be encoded with an outer block code, such as an (n, k) Reed-Solomon code, (block 512) to generate an outer-encoded block 612 containing data and parity. The block coding may be selectively performed. Outer-encoded block 612 simply contains the data in transport block 610 if the block coding is omitted. The outer code rate is $R_o = k/n$, where k and n are parameters of the outer code. A cyclic redundancy check (CRC) value is generated (block 514) based on the data and parity in outer-encoded block 612 and attached to the outer-encoded block to form a formatted block 614. The CRC value is used by a terminal to check whether the transport block is decoded correctly or in error. Other error detection codes may also be used instead of CRC.

Formatted block 614 may be partitioned (block 516) into one or multiple equal-sized code blocks, e.g., two code blocks 616a and 616b in FIG. 6. Each code block 616 is then encoded with an inner code (block 518) to generate an encoded block 618. The inner code may be a Turbo code, a convolutional code, a low-density parity check (LDPC) code, some other code, or a combination thereof. The inner code may have a fixed code rate of $1/R_b$ and may generate $R_b$ code bits for each input bit. For example, the inner code may be a rate ⅓ Turbo code that generates three code bits for each input bit. Rate matching (e.g., puncturing) is then performed (block 520) in accordance with rate matching parameters provided by higher layer to retain the desired number of code bits for each encoded block and to discard the remaining code bits. The inner code rate $R_i$ is determined by the fixed code rate and the rate matching. The retained code bits for each encoded block are scrambled (block 522) with a pseudo-random number (PN) sequence to randomize the bits. The randomized bits for each encoded block are then interleaved or reordered (block 524) to generate a processed block 624. The interleaving provides time diversity.

Processed blocks 624a and 624b are then partitioned into K output blocks, e.g., four output blocks 626a, 626b, 626c, and 626d in FIG. 6, one output block for each outer-frame. The four output blocks are mapped to the E-MBMS physical channel (block 526). The bits in each output block are mapped to modulation symbols based on a modulation scheme selected for the E-MBMS physical channel. The symbol mapping may be achieved by (1) grouping sets of B bits to form B-bit binary values, where B=2 for QPSK, B=4 for 16-QAM, and B=6 for 64-QAM, and (2) mapping each B-bit binary value to a point in a signal constellation for the selected modulation scheme. The four blocks of modulation symbols are transmitted in four time slots allocated to the E-MBMS physical channel in four outer-frames.

The transmission of a transport block in K (e.g., four) time slots that are evenly distributed across a super-frame can provide time diversity. The transmission time interval (TTI) for the transport block is one super-frame, which may be approximately one second. This TTI is typically much longer than the coherence time interval of a wireless channel. Hence, the transport block is spread over multiple coherence time intervals and is likely to observe different channel conditions. The transmission of the transport block in K bursts across the super-frame facilitates data reception and may reduce battery power consumption. A terminal may wake up periodically to receive a burst in each outer-frame and may sleep between bursts to conserve battery power. Each burst is sent in one time slot and may be as short as 0.667 ms. In contrast, a transport block may be sent continuously in a TTI of 80 ms for W-CDMA. The shorter TTI for W-CDMA results in less time diversity. Furthermore, the continuous transmission of the transport block in W-CDMA may result in higher battery consumption since a terminal is awake for the entire TTI of 80 ms (which is much longer than 4×0.667 ms) to receive the transport block.

In an embodiment, the transport block size for an E-MBMS physical channel is configurable and given in number of information bits. The number of modulation symbols that can be sent on the E-MBMS physical channel for the minimum slot allocation may be fixed by system design. For each transport block size, the coding and modulation are selected such that all of the information bits in the transport block can be sent in the modulation symbols available for the minimum slot allocation.

Each transport block size is associated with a spectral efficiency that may be given in units of information bits per modulation symbol. The spectral efficiency ($S_{eff}$) is approximately equal to the outer code rate ($R_o$) times the inner code rate ($R_i$) times the number of bits per modulation symbols (B), or $S_{eff} = R_o \cdot R_i \cdot B = R \cdot B$, where R is the overall code rate and is the product of the outer code rate and the inner code rate, or $R = R_o \cdot R_i$. The approximation in the spectral efficiency is due to the fact that the CRC is not taken into account.

The coding and modulation may be performed in various manners. In an embodiment, a set of code rates is supported for the outer code, and one of the supported outer code rates is selected for each transport block. The supported outer code rates may include an outer code rate of 1.0, which means that the outer code is omitted. A set of modulation schemes is also supported, and one of the supported modulation schemes is selected for each transport block. For a given transport block size, an inner code rate and a modulation scheme are selected for each outer code rate so that the transport block can be sent in the available modulation symbols.

The system may support a set of transport block (TB) formats, which may also be referred to as modes, rates, transport block sizes, and so on. Each supported TB format may be associated with a specific data rate, a specific spectral efficiency, a specific inner code rate, a specific modulation scheme, a specific transport block size, and a specific number of code blocks. The outer code rate may be specified independently. The outer code rate selection influences the parameters for the TB format such as the inner code rate, the modulation scheme, and the number of code blocks.

Table 2 shows an exemplary set of TB formats for frame design 2 in Table 1. Table 2 assumes that the minimum slot allocation is four time slots in a super-frame. Table 2 further assumes that 2331 modulation symbols can be sent in each time slot, e.g., 777 modulation symbols/OFDM symbol× three OFDM symbols/time slot. This may be achieved by a design with 1024 total subbands, 136 guard subbands, 888 usable subbands, 128 pilot subbands distributed across the 1024 total subbands, 777 usable data subbands, and 111 usable pilot subbands. The supported outer code rates are (16, 16), (16, 14), and (16, 12), and the supported modulation schemes are QPSK, 16-QAM, and 64-QAM. For each transport block size, an inner code rate and a modulation scheme are selected for each different outer code rate to achieve the desired spectral efficiency for that transport block size. For a given transport block size and modulation scheme, the inner code rate increases as the outer code rate decreases.

TABLE 2

| TB Format | Data Rate (kbps) | TB Size (bits) | Spectral Eff | Outer Code Rate (n, k) | Number of Code Blocks | Code Block Size (w CRC) | Inner Code Rate | Modulation Scheme |
|---|---|---|---|---|---|---|---|---|
| 1 | 4 | 1280 | 0.55 | — | 1 | 1296 | 0.2780 | QPSK |
|   |   |      |      | (16, 14) | 1 | 1480 | 0.3175 | QPSK |
|   |   |      |      | (16, 12) | 1 | 1728 | 0.3707 | QPSK |
| 2 | 8 | 2560 | 1.10 | — | 1 | 2576 | 0.5526 | QPSK |
|   |   |      |      | (16, 14) | 1 | 2944 | 0.3157 | 16-QAM |
|   |   |      |      | (16, 12) | 1 | 3432 | 0.3681 | 16-QAM |
| 3 | 16 | 5120 | 2.20 | — | 2 | 2568 | 0.5508 | 16-QAM |
|   |   |      |      | (16, 14) | 2 | 2936 | 0.4198 | 64-QAM |
|   |   |      |      | (16, 12) | 2 | 3424 | 0.4896 | 64-QAM |
| 4 | 20 | 6400 | 2.75 | — | 2 | 3208 | 0.4587 | 64-QAM |
|   |   |      |      | (16, 14) | 2 | 3668 | 0.5245 | 64-QAM |
|   |   |      |      | (16, 12) | 2 | 4276 | 0.6115 | 64-QAM |

Table 3 shows an exemplary set of TB formats for frame design 3 in Table 1.

TABLE 3

| TB Format | Data Rate (kbps) | TB Size (bits) | Spectral Eff | Outer Code Rate (n, k) | Number of Code Blocks | Code Block Size (w CRC) | Inner Code Rate | Modulation Scheme |
|---|---|---|---|---|---|---|---|---|
| 1 | 4 | 1000 | 0.43 | — | 1 | 1016 | 0.2179 | QPSK |
|   |   |      |      | (16, 14) | 1 | 1160 | 0.2488 | QPSK |
|   |   |      |      | (16, 12) | 1 | 1352 | 0.2900 | QPSK |
| 2 | 8 | 2000 | 0.86 | — | 1 | 2016 | 0.4324 | QPSK |
|   |   |      |      | (16, 14) | 1 | 2304 | 0.4942 | QPSK |
|   |   |      |      | (16, 12) | 1 | 2688 | 0.2883 | 16-QAM |
| 3 | 12 | 3000 | 1.29 | — | 1 | 3016 | 0.3235 | 16-QAM |
|   |   |      |      | (16, 14) | 1 | 3456 | 0.3707 | 16-QAM |
|   |   |      |      | (16, 12) | 1 | 4016 | 0.4307 | 16-QAM |
| 4 | 16 | 4000 | 1.72 | — | 1 | 4016 | 0.4307 | 16-QAM |
|   |   |      |      | (16, 14) | 1 | 4592 | 0.4925 | 16-QAM |
|   |   |      |      | (16, 12) | 2 | 2676 | 0.3827 | 64-QAM |
| 5 | 20 | 5000 | 2.15 | — | 1 | 5016 | 0.3586 | 64-QAM |
|   |   |      |      | (16, 14) | 2 | 2868 | 0.4101 | 64-QAM |
|   |   |      |      | (16, 12) | 2 | 3344 | 0.4782 | 64-QAM |
| 6 | 24 | 6000 | 2.57 | — | 2 | 3008 | 0.4301 | 64-QAM |
|   |   |      |      | (16, 14) | 2 | 3440 | 0.4919 | 64-QAM |
|   |   |      |      | (16, 12) | 2 | 4008 | 0.5731 | 64-QAM |

Tables 2 and 3 show some exemplary TB formats and outer code rates. In general, any number of TB formats and outer code rates may be used. A TB format may also be associated with any set of parameters.

A Turbo code and an (n, k) Reed Solomon code may be employed as the inner code and the outer code, respectively, to capture time diversity and improve performance. In theory, it is preferable to perform Turbo coding over an entire TTI, which is one super-frame for an E-MBMS physical channel. The Turbo code may be used alone without the outer code and, with sufficient interleaving, is capable of exploiting the time diversity in the system. However, from a practical point of view, there are typically restrictions imposed by the decoder buffer size. In these cases, the length of Turbo coded blocks/packets may be limited (e.g., to approximately 5000 bits), and time diversity may be collected with the outer code. The outer code may or may not be used for any given E-MBMS physical channel in any given super-frame. A primary role of the outer code is to assist in collecting time diversity. Collecting time diversity is further facilitated by the super-frame structure shown in FIG. 2 since a transport block is sent in K bursts that are distributed over an entire super-frame and hence has a relatively long TTI.

Figure 7:
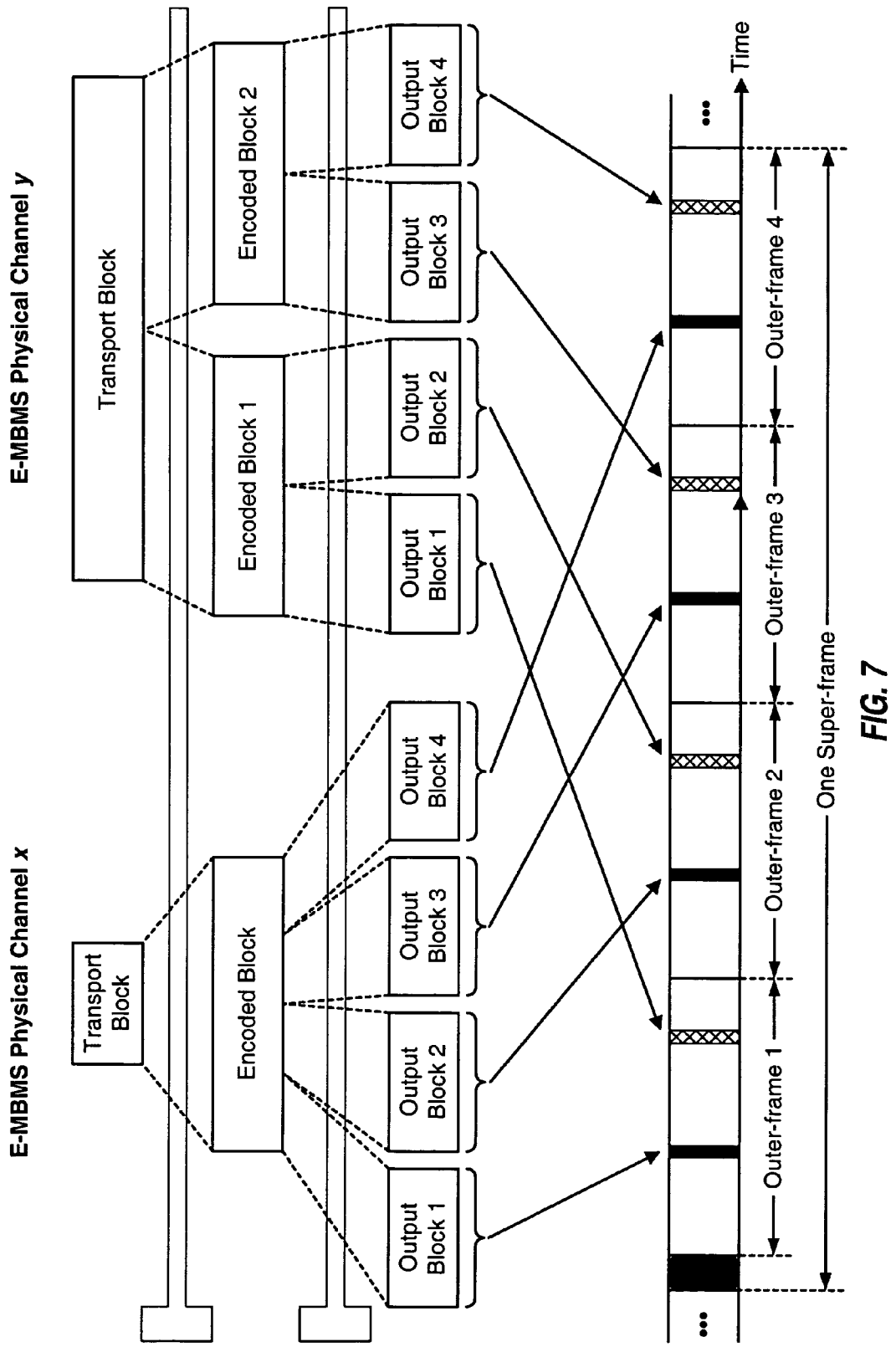
FIG. 7 shows transmission of transport blocks on two E-MBMS physical channels.

FIG. 7 shows transmission of transport blocks with different sizes on two E-MBMS physical channels x and y in one super-frame. For the example shown in FIG. 7, a small transport block (e.g., with 1000 bits) is sent on E-MBMS physical channel x and is encoded based on the outer and inner code rates applicable for this transport block to generate a single encoded block. This encoded block is further processed and modulated based on the applicable modulation scheme (e.g., QPSK) to generate four output blocks, which are sent in four time slots allocated to E-MBMS physical channel x. A larger transport block (e.g., with 4000 bits) is sent on E-MBMS physical channel y and is encoded based on the outer and inner code rates applicable for this transport block to generate two encoded blocks. These encoded blocks are further processed and modulated based on the applicable modulation scheme (e.g., 64-QAM) to generate four output blocks, which are sent in four time slots allocated to E-MBMS physical channel y. As shown in FIG. 7, different capacities are achieved for E-MBMS physical channels x and y even though both E-MBMS physical channels are allocated the minimum number of time slots.

The coding and modulation design described herein allows different data rates or transport block sizes to be used for an E-MBMS physical channel for the minimum slot allocation, as shown in FIG. 7. This flexible capacity allows the E-MBMS physical channel to support variable codec rates for multi-media data sent on the E-MBMS physical channel. This flexible capacity also allows for a tradeoff between source rate and coverage for the minimum slot allocation. The coding and modulation design also maintains a constant data rate for the E-MBMS physical channel regardless of (1) whether or not the outer code is used and (2) the selected outer code rate. The constant data rate simplifies the allocation of system resources to streams at a higher layer. The outer code may optionally be used to collect time diversity. A small number of outer code rates may be supported to simplify the block coding.

Tables 2 and 3 and FIGS. 5 and 6 show a specific embodiment for performing coding and modulation. The coding and modulation may also be performed in other manners. For example, a transport block may be partitioned into K code blocks that may be sent in K time slots for K outer-frames of a super-frame, one code block in each time slot. The information bits for the transport block may be sent in code block 1 and possibly code block 2. Each remaining code block may contain additional redundancy information. A terminal observing good channel conditions may be able to decode the transport block based on fewer than K code blocks, and may be able to go to sleep until the next super-frame. For outer code rate (16, 12), the parity bits generated by the block code may be sent in the last code block, which is transmitted in the last outer-frame. The terminal does not need to receive this code block if the transport block is already decoded correctly and can sleep through the last outer-frame.

In an embodiment, an E-MBMS physical channel may be transmitted with or without layered coding, which is commonly called hierarchical coding. Layered coding may be used to send a base stream and an enhancement stream on one E-MBMS physical channel. The base stream may carry information intended for all terminals within a broadcast coverage area, and the enhancement stream may carry additional information intended for terminals observing better channel conditions. With layered coding, the base stream is encoded based on the outer and inner code rates selected for the base stream, and the enhancement stream is encoded based on the outer and inner code rates selected for the enhancement stream. The encoded data for the two streams may be independently mapped to modulation symbols, which may be appropriately scaled and combined to generate output symbols for transmission on the E-MBMS physical channel. Alternatively, the encoded data for the two streams may be jointly mapped to modulation symbols based on a signal constellation for a joint modulation scheme. In any case, the resultant symbols are sent on the E-MBMS physical channel. The base stream is typically sent using more transmit power and/or more robust outer and inner code rates to allow for reception by all terminals. The enhancement stream may be sent using less transmit power and/or less robust outer and inner code rates. A terminal can process a received signal and recover the base stream sent on the E-MBMS physical channel. The terminal can then estimate the interference due to the base stream, subtract the estimated interference from the received signal, and process the interference-canceled signal to recover the enhancement stream.

Figure 8:
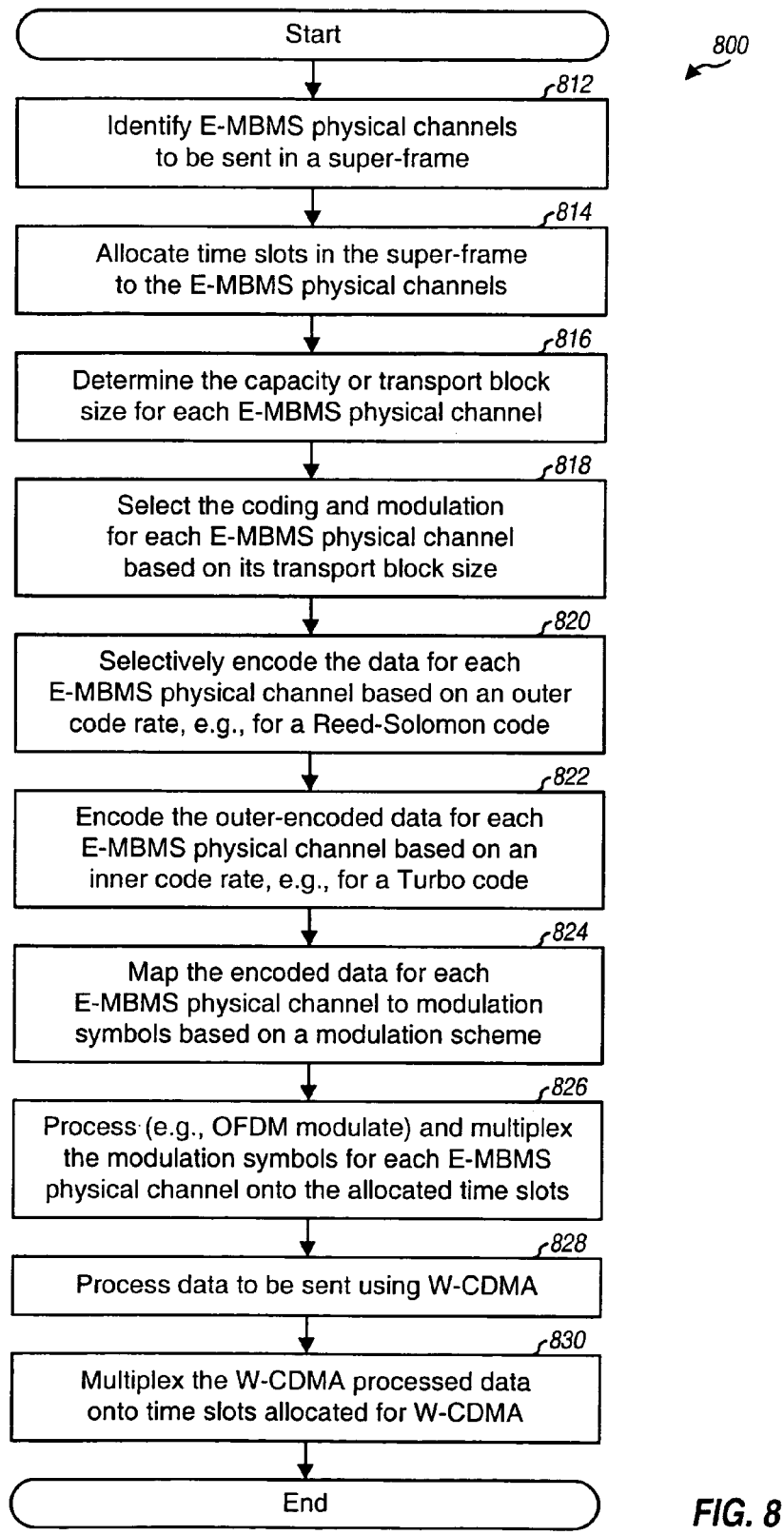
FIG. 8 shows a process for transmitting data in a super-frame.

FIG. 8 shows a process 800 for transmitting data in a super-frame. E-MBMS physical channels to be sent in the super-frame are initially identified (block 812). Time slots in the super-frame are allocated to the E-MBMS physical channels (block 814). Each E-MBMS physical channel may be allocated an integer multiple of the minimum slot allocation, which may be K time slots for K outer-frames of the super-frame. The capacity or transport block size for each E-MBMS physical channel is determined, e.g., based on the amount of data to send and/or the desired coverage for the E-MBMS physical channel (block 816). The coding and modulation for each E-MBMS physical channel are selected based on the transport block size for the E-MBMS physical channel (block 818).

The data for each E-MBMS physical channel is processed based on the coding and modulation selected for the physical channel. This processing may include selectively encoding the data for each E-MBMS physical channel based on an outer code rate, e.g., for a Reed-Solomon code (block 820), and further encoding the outer-encoded data based on an inner code rate, e.g., for a Turbo code, to generate encoded data for the E-MBMS physical channel (block 822). The outer code rate and the inner code rate for each E-MBMS physical channel are determined by the overall code rate for the E-MBMS physical channel. The encoded data for each E-MBMS physical channel is mapped to modulation symbols based on a modulation scheme for the E-MBMS physical channel (block 824). The modulation symbols for each E-MBMS physical channel are further processed (e.g., OFDM modulated) and multiplexed onto the time slots allocated to the E-MBMS physical channel (block 826). Data to be sent using another radio technology (e.g., W-CDMA) is also processed (e.g., encoded, interleaved, and modulated) (block 828) and multiplexed onto time slots allocated for this radio technology (block 830).

Figure 9:
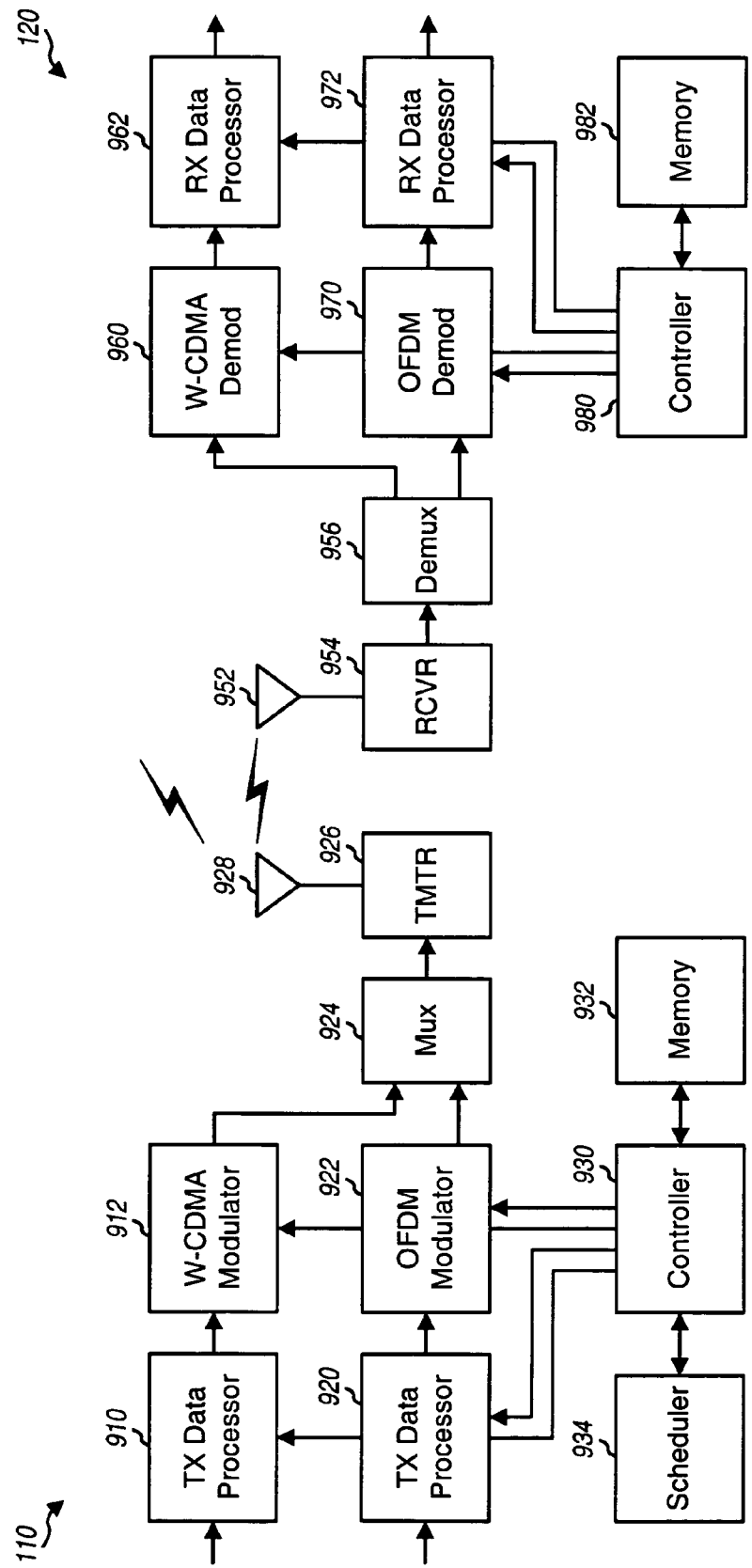
FIG. 9 shows a block diagram of a base station and a terminal.

FIG. 9 shows a block diagram of an embodiment of base station 110 and terminal 120. At base station 110, a transmit (TX) data processor 910 receives and processes traffic data to be sent with W-CDMA and generates encoded data for W-CDMA. A W-CDMA modulator 912 processes the W-CDMA encoded data and generates a W-CDMA waveform for each W-CDMA slot. The processing by W-CDMA modulator 912 includes (1) mapping the encoded data for each W-CDMA physical channel to modulation symbols, (2) channelizing the modulation symbols for each physical channel with an orthogonal sequence, (3) scrambling the channelized symbols for each physical channel with a scrambling code, and (4) scaling and summing the scrambled data for all physical channels. A TX data processor 920 receives and processes traffic data to be sent using OFDM and generates data and pilot symbols. Data processor 920 may be implemented as shown in FIG. 5. An OFDM modulator 922 performs OFDM modulation on the data and pilot symbols, generates OFDM symbols, and forms an OFDM waveform for each E-MBMS slot. A multiplexer (Mux) 924 multiplexes W-CDMA waveforms onto W-CDMA slots, multiplexes OFDM waveforms onto E-MBMS slots, and provides an output signal. A transmitter unit (TMTR) 926 conditions (e.g., converts to analog, filters, amplifies, and frequency upconverts) the output signal and generates a modulated signal that is transmitted from an antenna 928.

At terminal 120, an antenna 952 receives the modulated signal transmitted by base station 110 and provides a received signal to a receiver unit (RCVR) 954. Receiver unit 954 conditions, digitizes, and processes the received signal and provides a stream of samples to a demultiplexer (Demux) 956. Demultiplexer 956 provides samples in W-CDMA slots to a W-CDMA demodulator (Demod) 960 and provides samples in E-MBMS slots to an OFDM demodulator 970. W-CDMA demodulator 960 processes the received samples in a manner complementary to the processing by W-CDMA modulator 912 and provides symbol estimates. A receive (RX) data processor 962 processes (e.g., demodulates, deinterleaves, and decodes) the symbol estimates and provides decoded data for W-CDMA. OFDM demodulator 970 performs OFDM demodulation on the received samples and provides data symbol estimates. An RX data processor 972 processes the data symbol estimates and provides decoded data for OFDM. In general, the processing at terminal 120 is complementary to the processing at base station 110.

Controllers 930 and 980 direct the operation at base station 110 and terminal 120, respectively. Memory units 932 and 982 store program codes and data used by controllers 930 and 980, respectively. Controller 930 and/or a scheduler 934 allocates time slots for the downlink and uplink, determines whether to use W-CDMA or OFDM for each time slot, and allocates time slots to E-MBMS physical channels. Controller 930 also generates various controls to direct the coding and modulation for the E-MBMS physical channels.

Figure 10:
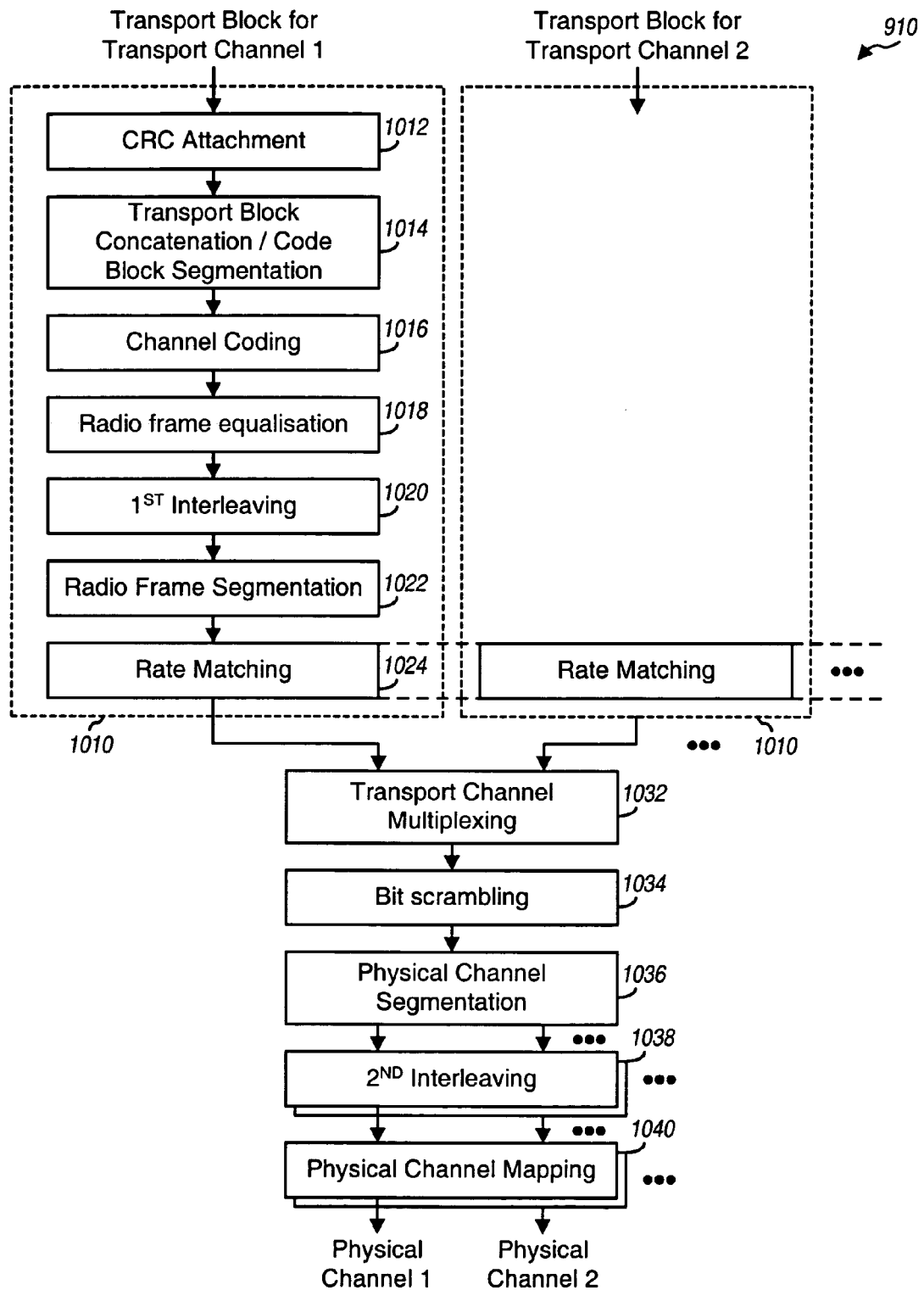
FIG. 10 shows data processing for W-CDMA.

FIG. 10 shows a block diagram of an embodiment of W-CDMA TX data processor 910. Data for each transport channel (TrCH) is provided in transport blocks to a respective processing section 1010. Within each section 1010, a CRC value is generated for each transport block and attached to the transport block (block 1012). CRC encoded blocks are serially concatenated and then partitioned into equal-sized code blocks (block 1014). Each code block is encoded with a coding scheme (e.g., a convolutional code or a Turbo code) or not encoded at all (block 1016). Radio frame equalisation may be performed to pad the input bit sequence so that the output can be segmented into an integer number of data segments of equal size (block 1018). The bits are then interleaved across 1, 2, 4 or 8 (10 ms) radio frames to provide time diversity (block 1020). The interleaved bits are segmented and mapped onto 10 ms TrCH radio frames (block 1022). Rate matching is then performed on the bits in accordance with rate matching parameters provided by higher layer (block 1024).

The TrCH radio frames from all processing sections 1010 are serially multiplexed into a coded composite transport channel (CCTrCH) (block 1032). Bit scrambling is then performed to randomize the bits (block 1034). If more than one physical channel is used, then the bits are segmented among the physical channels (block 1036). The bits in each radio frame for each physical channel are interleaved to provide additional time diversity (block 1038). The interleaved physical channel radio frames are then mapped to the proper physical channels (block 1040).

The processing by TX data processor 910 for W-CDMA is described in detail in 3GPP TS 25.212. The processing by W-CDMA modulator 912 is described in detail in 3GPP TS 25.213. These documents are publicly available.

Figure 11:
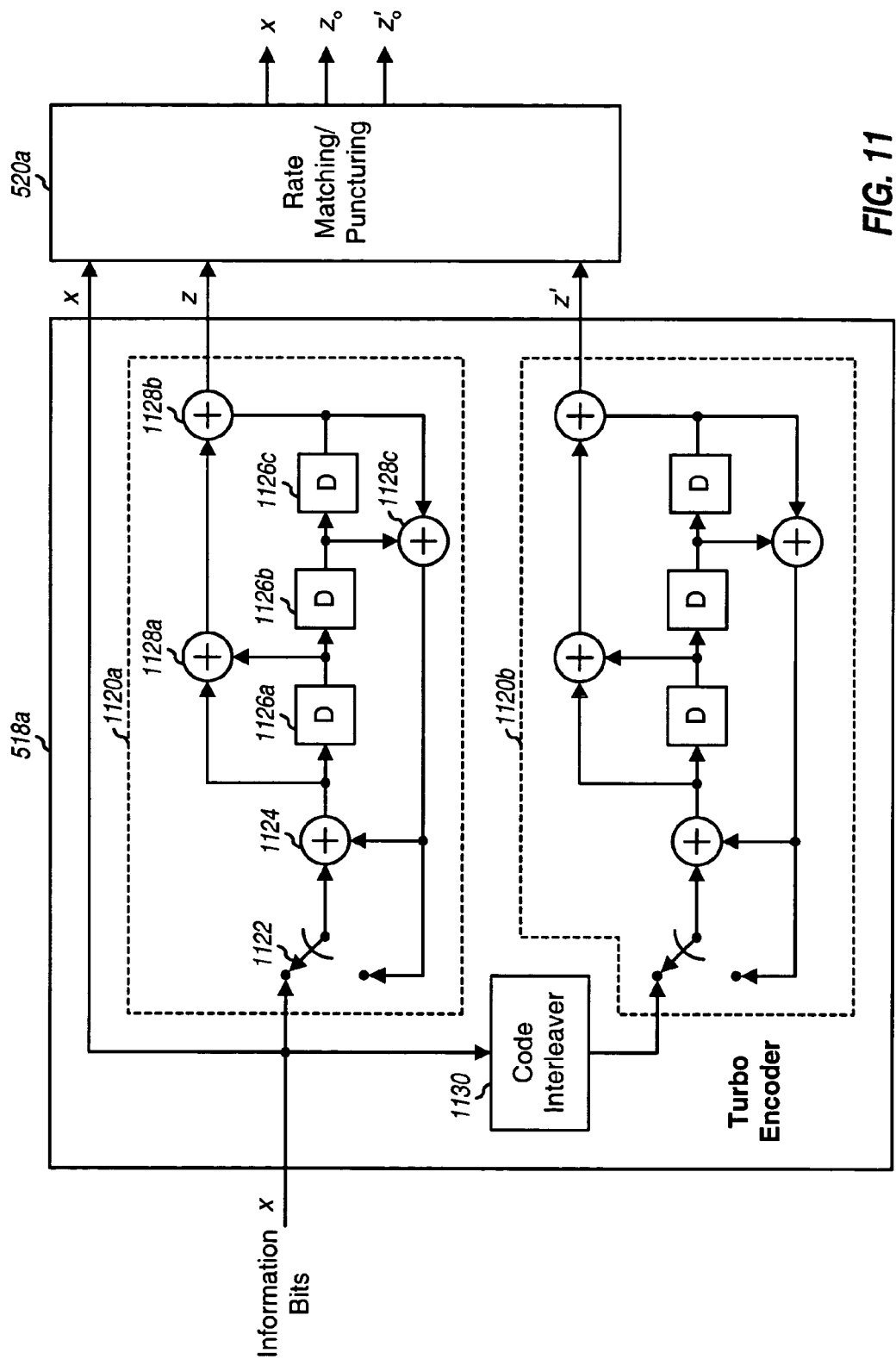
FIG. 11 shows a Turbo encoder.

FIG. 11 shows an embodiment of a Turbo encoder 518a, which may be used for channel coding block 518 in FIG. 5. For this embodiment, Turbo encoder 518a is a rate ⅓ encoder that provides two parity bits z and z' for each input bit x. Turbo encoder 518a includes two constituent encoders 1120a and 1120b and a code interleaver 1130. Each constituent encoder 1120 implements the following constituent code:

$$G(D) = \left[1, \frac{g_0(D)}{g_1(D)}\right],$$

where $g_0(D)=1+D^2+D^3$ and $g_1(D)=1+D+D^3$. Other constituent codes may also be used. Other code rates (e.g., rate ⅕) may also be used for the Turbo encoder.

Each constituent encoder 1120 includes three series-coupled delay elements 1126a, 1126b, and 1126c, four modulo-2 adders 1124, 1128a, 1128b, and 1128c, and a switch 1122. Initially, delay elements 1126a, 1126b, and 1126c are set to zeros and switch 1122 is in the 'up' position. Then, for each input bit in a code block, adder 1124 performs modulo-2 addition of the input bit with the output bit from adder 1128c and provides the result to delay element 1126a. Adder 1128a performs modulo-2 addition of the bits from adder 1124 and delay element 1126a. Adder 1128b performs modulo-2 addition of the bits from adder 1128a and delay element 1126c and provides parity bit z. Adder 1126c performs modulo-2 addition of the bits from delay elements 1126b and 1126c. After all input bits in the code block have been encoded, switch 1122 is moved to the 'down' position and three zero (0) bits are provided to constituent encoder 1120a. Constituent encoder 1120a then encodes the three zero bits and provides three tail systematic bits and three tail parity bits.

For each code block of W input bits x, constituent encoder 1120a provides the W input bits x, the first three tail systematic bits, W parity bits z, and the first three tail parity bits. Constituent encoder 1120b provides the second three tail systematic bits, W parity bits z', and the last three tail parity bits. For each code block, Turbo encoder 518a provides W input bits, six tail systematic bits, W+3 parity bits z from constituent encoder 1120a, and W+3 parity bits z' from constituent encoder 1120b.

Code interleaver 1130 reorders the W input bits in the code block and may be implemented as described in the aforementioned 3GPP TS 25.212.

The transmission techniques described herein may be implemented by various means. For example, these techniques may be implemented in hardware, software, or a combination thereof. For a hardware implementation, the processing units used to allocate time slots to physical channels and process data for transmission may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof. The processing units used to receive data may also be implemented within one or more ASICs, DSPs, processors, and so on.

For a software implementation, the transmission techniques may be implemented with modules (e.g., procedures, functions, and so on) that perform the functions described herein. The software codes may be stored in a memory unit (e.g., memory unit 932 or 982 in FIG. 9) and executed by a processor (e.g., controller 930 or 980). The memory unit may be implemented within the processor or external to the processor, in which case it can be communicatively coupled to the processor via various means as is known in the art.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An apparatus comprising:
   a controller to identify physical channels for an enhanced multimedia broadcast/multicast service to be sent in a super-frame comprised of a plurality of time slots, to allocate at least two time slots in the super-frame to each of the physical channels, to select a transport block size from among a plurality of different transport block sizes for each physical channel, and to select coding and modulation for each of the physical channels based on the transport block size selected for each physical channel, wherein different transport block sizes are selected for different physical channels that have the same slot allocation in the super-frame; and a processor to process data for each physical channel based on the coding and modulation selected for the physical channel and to multiplex processed data for each physical channel onto the at least two time slots allocated to the physical channel;

wherein the super-frame comprises at least two outer-frames, wherein each outer-frame comprises multiple frames, wherein each frame comprises multiple time slots, and wherein the at least two time slots allocated to each physical channel include at least one time slot in at least one frame of each outer-frame of the super-frame; and wherein each of the physical channels is allocated an integer multiple of a minimum slot allocation, the minimum slot allocation being one time slot in at least one frame of each outer-frame of the super-frame, wherein one transport block is sent on a physical channel in the super-frame for each minimum slot allocation.

2. The apparatus of claim 1, wherein each physical channel is allocated K time slots that are evenly spaced apart by M time slots.

3. The apparatus of claim 1, wherein the coding and modulation for each physical channel are fixed for a duration of the super-frame, and wherein the coding and modulation for a particular physical channel are selected such that a transport block can be sent on the physical channel in a defined number of time slots for the minimum slot allocation.

4. The apparatus of claim 1, wherein the processor encodes the data for each physical channel based on an overall code rate selected for the physical channel and further maps encoded data for each physical channel to modulation symbols based on a modulation scheme selected for the physical channel.

5. The apparatus of claim 4, wherein the processor selectively encodes the data for each physical channel based on an outer code rate to generate outer-encoded data for the physical channel and further encodes the outer-encoded data for each physical channel based on an inner code rate to generate the encoded data for the physical channel.

6. The apparatus of claim 5, wherein the outer code rate and the inner code rate for each physical channel are determined by the overall code rate selected for the physical channel.

7. The apparatus of claim 1, wherein the processor selectively encodes the data for each physical channel based on a Reed-Solomon code to generate outer-encoded data for the physical channel and further encodes the outer-encoded data for each physical channel based on a Turbo code to generate the encoded data for the physical channel.

8. The apparatus of claim 1, further comprising:
a modulator to generate Orthogonal Frequency Division Multiplexing (OFDM) symbols for each physical channel based on the processed data for the physical channel.

9. The apparatus of claim 1, wherein the controller selects a radio technology from among at least two radio technologies for each of the plurality of time slots in the super-frame, and wherein the processor processes the physical channels based on a first radio technology among the at least two radio technologies.

10. The apparatus of claim 9, further comprising:
a second processor to process data to be sent using a second radio technology and to multiplex processed data for the second radio technology onto time slots allocated to the second radio technology.

11. The apparatus of claim 9, wherein the at least two radio technologies comprise Orthogonal Frequency Division Multiplexing (OFDM) and Wideband Code Division Multiple Access (W-CDMA).

12. The apparatus of claim 1, wherein the controller determines a capacity of each physical channel and further selects the coding and modulation for each physical channel based on the capacity of the physical channel.

13. A method of processing data for transmission in a wireless communication system, the method comprising:
identifying, by a base station, physical channels for an enhanced multimedia broadcast/multicast service to be sent in a super-frame comprised of a plurality of time slots, wherein the super-frame comprises at least two outer-frames, wherein each outer-frame comprises multiple frames, and wherein each frame comprises multiple time slots;

allocating, by the base station, at least two time slots in the super-frame to each of the physical channels, wherein the at least two time slots allocated to each physical channel include at least one time slot in at least one frame of each outer-frame of the super-frame, wherein each of the physical channels is allocated an integer multiple of a minimum slot allocation, the minimum slot allocation being one time slot in at least one frame of each outer-frame of the super-frame, wherein one transport block is sent on a physical channel in the super-frame for each minimum slot allocation;

selecting, by the base station, a transport block size from among a plurality of different transport block sizes for each physical channel, wherein different transport block sizes are selected for different physical channels that have the same slot allocation in the super-frame;

selecting, by the base station, coding and modulation for each of the physical channels based on the transport block size selected for each physical channel;

processing, by the base station, data for each physical channel based on the coding and modulation selected for the physical channel; and multiplexing, by the base station, processed data for each physical channel onto the at least two time slots allocated to the physical channel.

14. The method of claim 13, wherein the processing the data for each physical channel comprises
encoding the data for each physical channel based on an overall code rate selected for the physical channel, and
mapping encoded data for each physical channel to modulation symbols based on a modulation scheme selected for the physical channel.

15. The method of claim 14, wherein the encoding the data for each physical channel comprises
selectively encoding the data for each physical channel based on an outer code rate to generate outer-encoded data for the physical channel, and
encoding the outer-encoded data for each physical channel based on an inner code rate to generate the encoded data for the physical channel.

16. The method of claim 13, further comprising:
processing the physical channels based on a first radio technology;
processing data to be sent using a second radio technology; and multiplexing processed data for the second radio technology onto time slots allocated to the second radio technology.

17. The method of claim 13, wherein the selecting the coding and modulation for each of the physical channels comprises:
determining a capacity of each physical channel; and
selecting the coding and modulation for each physical channel based on the capacity of the physical channel.

18. The method of claim 13, wherein processing the data for a physical channel comprises processing a transport block for the physical channel, and wherein processing the transport block for the physical channel comprises:
encoding the transport block with an outer block code, thereby generating an outer-encoded block containing data and parity;
generating a cyclic redundancy check value based on the data and the parity in the outer-encoded block;
attaching the cyclic redundancy check value to the outer-encoded block to form a formatted block;
partitioning the formatted block into multiple equal-sized code blocks;
encoding each of the code blocks with an inner code to generate multiple encoded blocks;
performing rate matching to retain a desired number of code bits for each encoded block;
scrambling retained code bits for each encoded block with a pseudo-random number sequence, thereby generating randomized bits for each encoded block;
interleaving the randomized bits for each encoded block to generate multiple processed blocks, wherein the interleaving is performed after the code blocks are encoded with the inner code;
partitioning the processed blocks into multiple output blocks; and
mapping bits in each output block to modulation symbols based on a modulation scheme selected for the physical channel.

19. An apparatus comprising:
means for identifying physical channels for an enhanced multimedia broadcast/multicast service to be sent in a super-frame comprised of a plurality of time slots;
means for allocating at least two time slots in the super-frame to each of the physical channels;
means for selecting a transport block size from among a plurality of different transport block sizes for each physical channel, wherein different transport block sizes are selected for different physical channels that have the same slot allocation in the super-frame;
means for selecting coding and modulation for each of the physical channels based on the transport block size selected for each physical channel;
means for processing data for each physical channel based on the coding and modulation selected for the physical channel; and
means for multiplexing processed data for each physical channel onto the at least two time slots allocated to the physical channel;
wherein each of the physical channels is allocated an integer multiple of the minimum slot allocation, the minimum slot allocation being one time slot in at least one frame of each outer-frame of the super-frame, wherein one transport block is sent on a physical channel in the super-frame for each minimum slot allocation.

20. The apparatus of claim 19, wherein the means for processing the data for each physical channel comprises
means for encoding the data for each physical channel based on an overall code rate selected for the physical channel, and
means for mapping encoded data for each physical channel to modulation symbols based on a modulation scheme selected for the physical channel.

21. The apparatus of claim 20, wherein the means for encoding the data for each physical channel comprises
means for selectively encoding the data for each physical channel based on an outer code rate to generate outer-encoded data for the physical channel, and
means for encoding the outer-encoded data for each physical channel based on an inner code rate to generate the encoded data for the physical channel.

22. The apparatus of claim 19, further comprising:
means for processing the physical channels based on a first radio technology;
means for processing data to be sent using a second radio technology; and
means for multiplexing processed data for the second radio technology onto time slots allocated to the second radio technology.

23. The apparatus of claim 19, wherein the means for selecting the coding and modulation for each of the physical channels comprises:
means for determining a capacity of each physical channel; and
means for selecting the coding and modulation for each physical channel based on the capacity of the physical channel.

24. An apparatus comprising:
a controller to identify physical channels for an enhanced multimedia broadcast/multicast service to be received in a super-frame comprised of a plurality of time slots, to determine at least two time slots allocated to each of the physical channels in the super-frame, and to determine coding and modulation used for each physical channel, wherein the super-frame comprises at least two outer-frames, wherein each outer-frame comprises multiple frames, wherein each frame comprises multiple time slots, wherein the at least two time slots allocated to each physical channel include at least one time slot in at least one frame of each outer-frame of the super-frame, and wherein the coding and modulation for each physical channel are selected based on a transport block size selected from among a plurality of different transport block sizes for each physical channel; and
a processor to demultiplex received data for each physical channel from the at least two time slots allocated to the physical channel and to process the received data for each physical channel based on the coding and modulation used for the physical channel, wherein the data received in the super-frame comprises transport blocks of different sizes for different physical channels that have the same slot allocation;
wherein each of the physical channels is allocated an integer multiple of a minimum slot allocation, the minimum slot allocation being one time slot in at least one frame of each outer-frame of the super-frame, wherein one transport block is received on a physical channel in the super-frame for each minimum slot allocation.

25. The apparatus of claim 24, wherein the processor demodulates the received data for each physical channel based on a modulation scheme selected for the physical channel and further decodes demodulated data for each physical channel based on an overall code rate selected for the physical channel.

26. The apparatus of claim 25, wherein the processor decodes the demodulated data for each physical channel based on an inner code rate to obtain inner-decoded data and further selectively decodes the inner-decoded data based on an outer code rate to obtain decoded data for the physical channel.

27. The apparatus of claim 25, wherein the processor decodes the demodulated data for each physical channel based on a Turbo code to obtain inner-decoded data and further selectively decodes the inner-decoded data based on a Reed-Solomon code to obtain decoded data for the physical channel.

28. The apparatus of claim 24, further comprising:
a demodulator to perform Orthogonal Frequency Division Multiplexing (OFDM) demodulation on the received data for each physical channel.

29. The apparatus of claim 24, wherein the processor processes the received data for the physical channels in accordance with a first radio technology among at least two radio technologies.

30. The apparatus of claim 29, further comprising:
a second processor to demultiplex received data for a second radio technology from time slots allocated to the second radio technology and to process the received data for the second radio technology in accordance with the second radio technology.

31. The apparatus of claim 30, wherein the first radio technology is Orthogonal Frequency Division Multiplexing (OFDM), and wherein the second radio technology is Wideband Code Division Multiple Access (W-CDMA).

32. A method of receiving data in a wireless communication system, the method comprising:
identifying, by a terminal, physical channels for an enhanced multimedia broadcast/multicast service to be received in a super-frame comprised of a plurality of time slots, wherein the super-frame comprises at least two outer-frames, wherein each outer-frame comprises multiple frames, and wherein each frame comprises multiple time slots;
determining, by the terminal, at least two time slots allocated to each of the physical channels in the super-frame, wherein the at least two time slots allocated to each physical channel include at least one time slot in at least one frame of each outer-frame of the super-frame, wherein each of the physical channels is allocated an integer multiple of a minimum slot allocation, the minimum slot allocation being one time slot in at least one frame of each outer-frame of the super-frame, wherein one transport block is received on a physical channel in the super-frame for each minimum slot allocation;
determining, by the terminal, coding and modulation used for each physical channel based on a transport block size selected from among a plurality of different transport block sizes for each physical channel;
demultiplexing, by the terminal, received data for each physical channel from the at least two time slots allocated to the physical channel; and
processing, by the terminal, the received data for each physical channel based on the coding and modulation used for the physical channel, wherein the data received in the super-frame comprises transport blocks of different sizes for different physical channels that have the same slot allocation.

33. The method of claim 32, wherein the processing the received data for each physical channel comprises
demodulating the received data for each physical channel based on a modulation scheme selected for the physical channel, and
decoding demodulated data for each physical channel based on an overall code rate selected for the physical channel.

34. The method of claim 33, wherein the decoding the demodulated data for each physical channel comprises
decoding the demodulated data for each physical channel based on an inner code rate to obtain inner-decoded data, and
selectively decoding the inner-decoded data based on an outer code rate to obtain decoded data for the physical channel.

35. The method of claim 32, further comprising:
processing the received data for the physical channels in accordance with a first radio technology;
demultiplexing received data for a second radio technology from time slots allocated to the second radio technology; and
processing the received data for the second radio technology in accordance with the second radio technology.

36. An apparatus comprising:
means for identifying physical channels for an enhanced multimedia broadcast/multicast service to be received in a super-frame comprised of a plurality of time slots;
means for determining at least two time slots allocated to each of the physical channels in the super-frame;
means for determining coding and modulation used for each physical channel;
means for demultiplexing received data for each physical channel from the at least two time slots allocated to the physical channel; and
means for processing the received data for each physical channel based on the coding and modulation used for the physical channel, wherein the data received in the super-frame comprises transport blocks of different sizes for different physical channels that have the same slot allocation;
wherein each of the physical channels is allocated an integer multiple of a minimum slot allocation, the minimum slot allocation being one time slot in at least one frame of each outer-frame of the super-frame, wherein one transport block is received on a physical channel in the super-frame for each minimum slot allocation.

37. The apparatus of claim 36, wherein the means for processing the received data for each physical channel comprises
means for demodulating the received data for each physical channel based on a modulation scheme selected for the physical channel, and
means for decoding demodulated data for each physical channel based on an overall code rate selected for the physical channel.

38. The apparatus of claim 37, wherein the means for decoding the demodulated data for each physical channel comprises
means for decoding the demodulated data for each physical channel based on an inner code rate to obtain inner-decoded data, and
means for selectively decoding the inner-decoded data based on an outer code rate to obtain decoded data for the physical channel.

39. The apparatus of claim 36, further comprising:
means for processing the received data for the physical channels in accordance with a first radio technology;

means for demultiplexing received data for a second radio technology from time slots allocated to the second radio technology; and means for processing the received data for the second radio technology in accordance with the second radio technology.

40. A processor-readable memory having instructions for processing data for transmission in a wireless communication system, the instructions being executable by a processor to:

identify physical channels for an enhanced multimedia broadcast/multicast service to be sent in a super-frame comprised of a plurality of time slots, wherein the super-frame comprises at least two outer-frames, wherein each outer-frame comprises multiple frames, and wherein each frame comprises multiple time slots;

allocate at least two time slots in the super-frame to each of the physical channels, wherein the at least two time slots allocated to each physical channel include at least one time slot in at least one frame of each outer-frame of the super-frame, wherein each of the physical channels is allocated an integer multiple of a minimum slot allocation, the minimum slot allocation being one time slot in at least one frame of each outer-frame of the super-frame, wherein one transport block is received on a physical channel in the super-frame for each minimum slot allocation;

select a transport block size from among a plurality of different transport block sizes for each physical channel, wherein different transport block sizes are selected for different physical channels that have the same slot allocation in the super-frame;

select coding and modulation for each of the physical channels based on the transport block size selected for each physical channel;

process data for each physical channel based on the coding and modulation selected for the physical channel; and multiplex processed data for each physical channel onto the at least two time slots allocated to the physical channel.

41. A processor-readable memory having instructions for receiving data in a wireless communication system, the instructions being executable by a processor to:

identify physical channels for an enhanced multimedia broadcast/multicast service to be received in a super-frame comprised of a plurality of time slots, wherein the super-frame comprises at least two outer-frames, wherein each outer-frame comprises multiple frames, and wherein each frame comprises multiple time slots;

determine at least two time slots allocated to each of the physical channels in the super-frame, wherein the at least two time slots allocated to each physical channel include at least one time slot in at least one frame of each outer-frame of the super-frame, wherein each of the physical channels is allocated an integer multiple of a minimum slot allocation, the minimum slot allocation being one time slot in at least one frame of each outer-frame of the super-frame, wherein one transport block is received on a physical channel in the super-frame for each minimum slot allocation;

determine coding and modulation used for each physical channel, wherein the coding and modulation for each physical channel are selected based on a transport block size selected from among a plurality of different transport block sizes for each physical channel;

demultiplex received data for each physical channel from the at least two time slots allocated to the physical channel; and process the received data for each physical channel based on the coding and modulation used for the physical channel, wherein the data received in the super-frame comprises transport blocks of different sizes for different physical channels that have the same slot allocation.

* * * * *